United States Patent
He et al.

(10) Patent No.: US 11,038,652 B2
(45) Date of Patent: Jun. 15, 2021

(54) CONCURRENT TRANSMISSION OF ACKNOWLEDGMENT AND SCHEDULING REQUEST INFORMATION ON A CONTROL CHANNEL

(71) Applicant: APPLE INC., Cupertino, CA (US)

(72) Inventors: Hong He, Sunnyvale, CA (US); Debdeep Chatterjee, San Jose, CA (US); Gang Xiong, Portland, OR (US); Hwan-Joon Kwon, Portland, OR (US); Joonyoung Cho, Portland, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/500,890

(22) PCT Filed: Jun. 11, 2018

(86) PCT No.: PCT/US2018/036957
§ 371 (c)(1),
(2) Date: Oct. 4, 2019

(87) PCT Pub. No.: WO2018/227208
PCT Pub. Date: Dec. 13, 2018

(65) Prior Publication Data
US 2020/0136777 A1    Apr. 30, 2020

Related U.S. Application Data

(60) Provisional application No. 62/520,851, filed on Jun. 16, 2017, provisional application No. 62/517,803, filed on Jun. 9, 2017.

(51) Int. Cl.
*H04L 5/00* (2006.01)
*H04L 1/16* (2006.01)
*H04W 72/12* (2009.01)

(52) U.S. Cl.
CPC .......... *H04L 5/0053* (2013.01); *H04L 1/1671* (2013.01); *H04L 5/0007* (2013.01); *H04L 5/0055* (2013.01); *H04W 72/1284* (2013.01)

(58) Field of Classification Search
None
See application file for complete search history.

(56) References Cited

U.S. PATENT DOCUMENTS

| | | | |
|---|---|---|---|
| 2017/0041103 A1* | 2/2017 | Maattanen | H04B 7/0626 |
| 2017/0215206 A1* | 7/2017 | Cheng | H04W 16/14 |
| 2019/0098622 A1* | 3/2019 | Lee | H04W 72/0446 |

FOREIGN PATENT DOCUMENTS

| | | |
|---|---|---|
| EP | 3280086 A1 | 2/2018 |
| KR | 1020160118905 A | 10/2016 |

OTHER PUBLICATIONS

ZTE; R1-1707280; sPUCCH resource management; 3GPP TSG RAN WG1 Mtg #89; Hangzhou, China; May 15-19, 2017.

* cited by examiner

Primary Examiner — Jamaal Henson

(57) ABSTRACT

Technology for a user equipment (UE) operable for transmission of a shortened physical uplink control channel (sPUCCH) is disclosed. The UE can map symbols to physical resource blocks (PRBs) for a first subslot and a last subslot of a subframe for the sPUCCH. The UE can encode control information for transmission to a next generation node B (gNB) in selected PRBs.

18 Claims, 17 Drawing Sheets

CONCURRENT TRANSMISSION OF ACKNOWLEDGMENT AND SCHEDULING REQUEST INFORMATION ON A CONTROL CHANNEL

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB) or next generation node Bs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
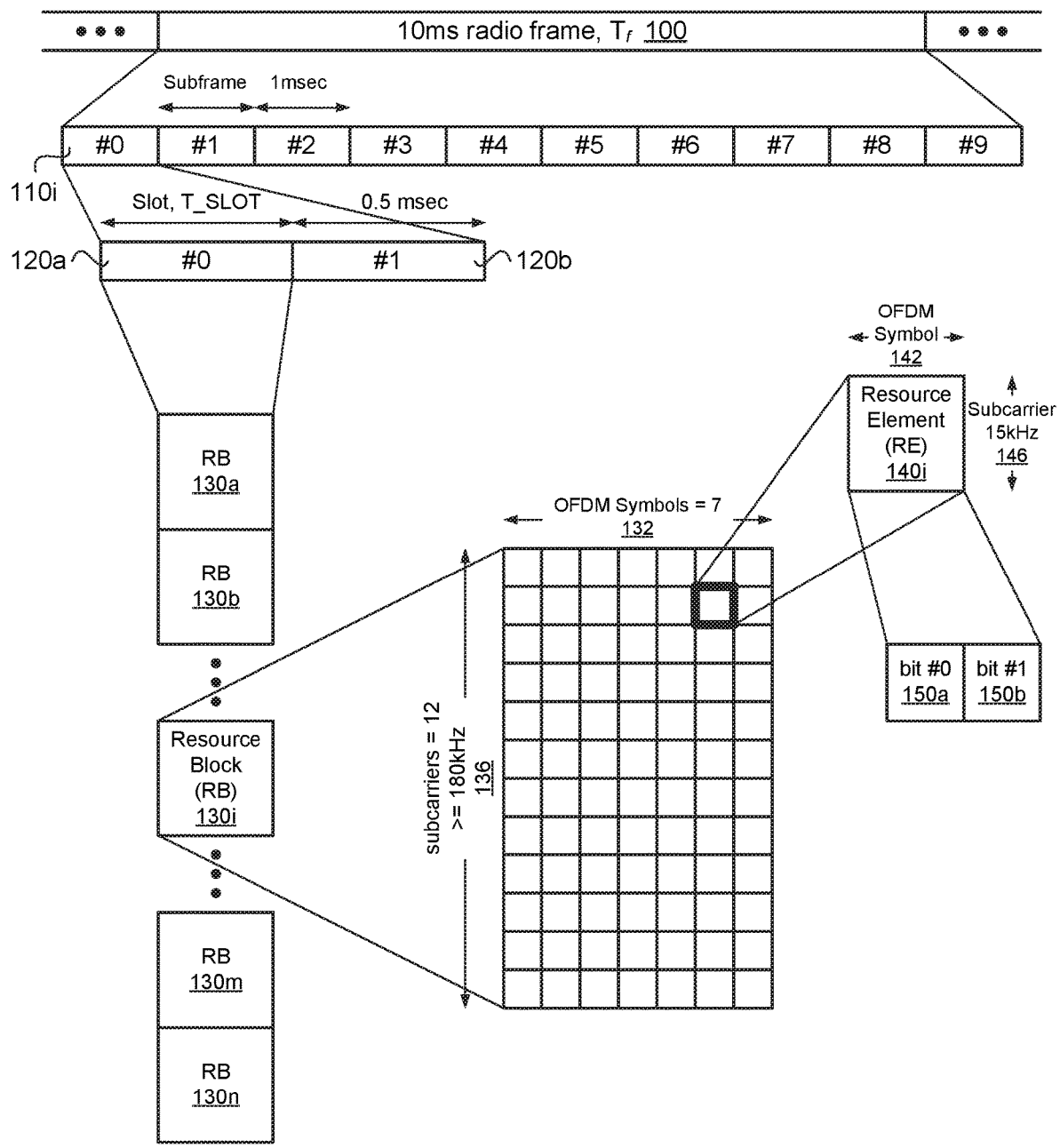
FIG. 1 illustrates a block diagram of an orthogonal frequency division multiple access (OFDMA) frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. The next generation wireless communication system, 5G, or, new radio (NR), can provide access to information and sharing of data, from numerous locations and at multiple times, by various users and applications. NR can be a unified network and system that can be directed to achieve vastly different, and at times conflicting, performance dimensions and services. Such a wide array of multi-dimensional constraints can be driven by different services and applications. In general, NR can evolve based on Third Generation Partnership Project (3GPP) long term evolved (LTE) Advanced with additional possible new Radio Access Technologies (RATs) to enrich people's lives with enhanced, simple, and seamless wireless solutions.

The NR use case families, e.g. Enhanced Mobile Broadband (eMBB) and ultra-reliable and low latency communications (URLLC), can vary in terms of user plane latency and coverage levels. The key constraints for URLLC can relate to user-plane latency and reliability. For URLLC, the target for user plane latency can be 0.5 milliseconds (ms) for UL and 0.5 ms for DL. The target for reliability can be 1 in 100,000 within 1 ms.

A range of new applications such as connected industrial plants, vehicular communications, or remote surgery can be characterized by using reliable real-time communication with a high latency. These applications can be implemented by using a shorter or shortened transmission time interval (sTTI) compared to a legacy subframe. An sTTI can also be referred to as a mini-slot.

In order to provide frequency diversity, a new sequence-based sPUCCH format without a demodulation reference signal (DM-RS) can be used to convey up to 2 hybrid automatic repeat request acknowledgement (HARQ-ACK) bits in a 2-symbol sTTI. Concurrent transmission of SR and HARQ-ACK bits can be achieved with minimal control signaling overhead. HARQ-ACK bits can be conditionally bundled and one of the PUCCH resources assigned for SR transmission can be selected on the basis of the bundled HARQ-ACK bits. In addition, unified frequency hopping and arrangements for sequence-based sPUCCH formats can be applied to both 2-symbol and 3-symbol PUCCH formats in order to simplify the UE implementation.

FIG. 1 provides an example of a 3GPP LTE Release 8 frame structure. In particular, FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into two slots 120a and 120b, each with a duration, $T_{slot}$, of 0.5 ms. The first slot (#0) 120a can include a legacy physical downlink control channel (PDCCH) 160 and/or a physical downlink shared channel (PDSCH) 166, and the second slot (#1) 120b can include data transmitted using the PDSCH.

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first Orthogonal Frequency Division Multiplexing (OFDM) symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130i can include 12-15 kilohertz (kHz) subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP LTE Release 8 frame structure provides examples of the way in which data is transmitted, or the transmission mode. The example is not intended to be limiting. Many of the Release 8 features will evolve and change in 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

Figure 2:
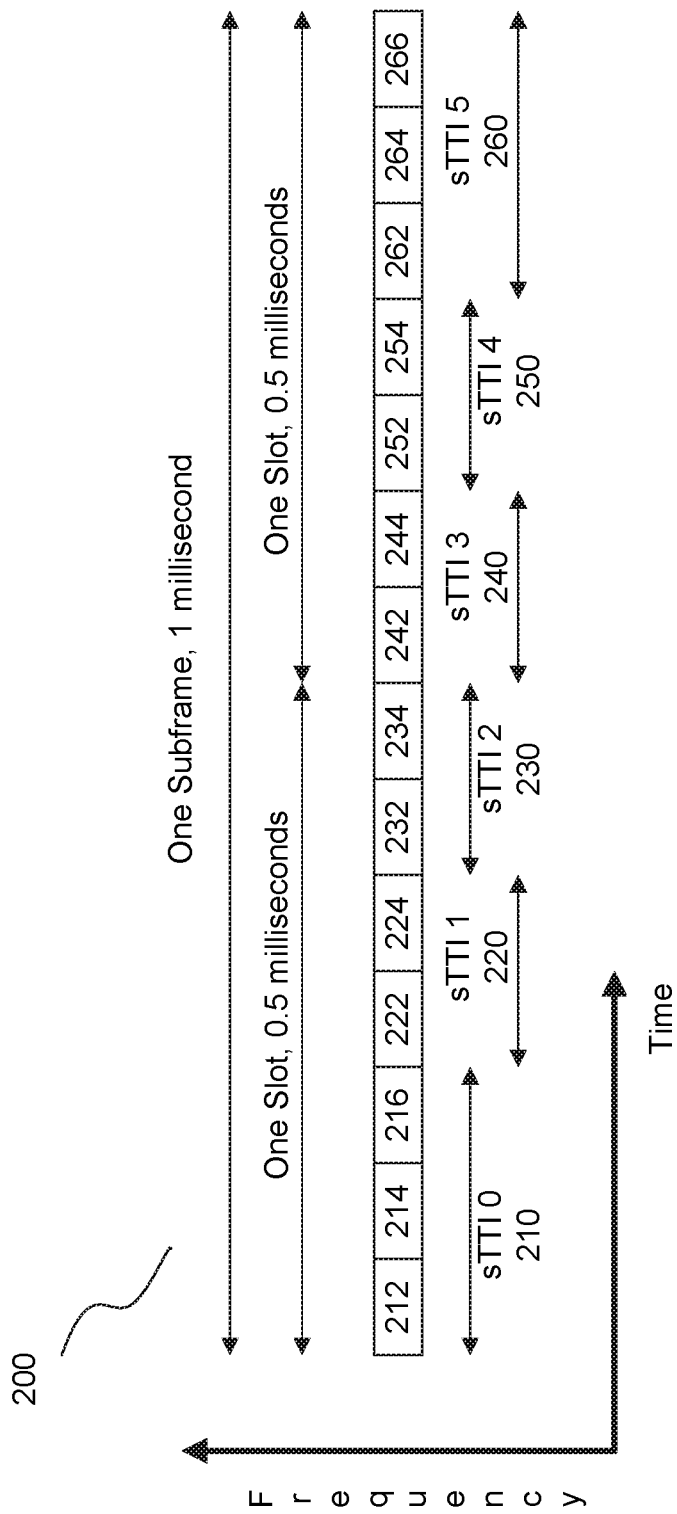
FIG. 2 illustrates a shortened transmission time interval (sTTI) configuration in accordance with an example.

FIG. 2 illustrates an sTTI configuration in accordance with an example. The sTTI can be implemented by splitting the legacy 1 millisecond (ms) subframe or transmission time interval (TTI) into a duration that can be shorter than a legacy 1 ms subframe. There can be different ways of defining sTTI, e.g. 2-symbol sTTI and slot-based sTTI. A 2-symbol sTTI configuration can include 2 symbols, as exemplified by 220, 230, 240, and 250, or 3 symbols, as exemplified by 210 and 260. Each legacy slot can be 0.5 ms and can include 7 symbols e.g., 212, 214, 216, 222, 224, 232, and 234 for a first slot and 242, 244, 252, 254, 262, 264, and 266 for a second slot. The first legacy slot can include 210 (sTTI 0), 220 (sTTI 1), and 230 (sTTI 2). sTTI 0 can include symbols 212, 214, and 216. sTTI 1 can include symbols 222 and 224. sTTI 2 can include symbols 232 and 234. The second slot can include 240 (sTTI 3), 250 (sTTI 4), and 260 (sTTI 5). sTTI 3 can include symbols 242 and 244. sTTI 4 can include symbols 252 and 254. sTTI 5 can include symbols 262, 264, and 266.

In another example, a sounding reference signal (SRS) can be transmitted at the last symbol of 260 (sTTI 5), and the SRS can be used by the base station to estimate the quality of the uplink channel for large bandwidths outside the span assigned to a specific user equipment (UE). In this example, when SRS is not transmitted in the subframe, a 3-symbol physical uplink control channel (PUCCH) format can be used for sTTI 5. In another example, when SRS is transmitted in the subframe, a 2-symbol PUCCH format can be used for sTTI 5 in order to avoid collisions with SRS transmissions in symbol 266. In this example, symbol 266 can be muted.

In another example, for sTTI operation, a UE can receive a data packet in the downlink (DL). In response, the UE can transmit a hybrid automatic repeat request acknowledgment (HARQ-ACK) signal. When the data packet reception by the UE in the DL is correct, then the UE can transmit an HARQ-ACK signal with an acknowledged (ACK) value. When the data packet reception by the UE in the DL is incorrect, then the UE can transmit an HARQ-ACK signal with a not acknowledged (NAK) value. A UE with data to send can also transmit a scheduling request (SR) signal and receive a scheduling grant before transmitting the data packet. The combination of HARQ-ACK and SR signals can be transmitted by the UE in the PUCCH in an sTTI.

In another example, the cyclic shift (CS) and the PUCCH resources can be used for transmission of PUCCH format x, e.g., formats 1, 1a, 1b, or 2, in order to convey two HARQ-ACK bits. The CS and the PUCCH resources can be identified by a resource index $n_{PUCCH}{}^{(x)}$ from which the quantities $n_{CS,i}{}^{(x)}$, where i=0, 1, 2, or 3, can be derived according to $n_{CS,0}{}^{(x)} = n_{PUCCH}{}^{(x)}$ mod $N_{SC}{}^{RB}$ and $n_{CS,i}{}^{(x)} = (n_{CS,0}{}^{(x)} + i)$ mod $N_{SC}{}^{RB}$, where i=1, 2, or 3 and where $N_{SC}{}^{RB}$ denotes the resource block size in the frequency domain expressed as a number of subcarriers, e.g., 12 in LTE. In another example, $n_{CS,0}{}^{(x)}$ can be explicitly configured by higher layer signaling. Four consecutive CSs of the constant amplitude zero autocorrelation (CAZAC) sequence, starting from the $n_{CS,0}{}^{(x)}$ can be reserved for HARQ-ACK transmission.

In another example, $n_{CS,i}{}^{(x)} = (n_{CS,0}{}^{(x)} + (i \times \Delta_{CS,shift}{}^{PUCCH}))$ mod $N_{SC}{}^{RB}$, where i=1, 2, or 3 and where $N_{SC}{}^{RB}$ denotes the resource block size in the frequency domain expressed as a number of subcarriers, e.g., 12 in LTE, and where $$\Delta_{CS,shift}^{PUCCH} = \frac{N_{SC}^{RB}}{K},$$

where K can be 4 or configured by higher layers.

In another example, control signaling overhead can be minimized by multiplexing PUCCH in sTTI with the legacy PUCCH format 1, 1a, 1b, or 2 in one physical resource block (PRB). The CS can be used in a symbol number k and a slot number $n_s$ according to: $n_{CS,i}{}^{(x)}(n_s, k) = [n_{CS}{}^{cell}(n_s,k) + n_{CS,i}{}^{(x)}]$ mod $N_{SC}{}^{RB}$, where i=0, 1, 2, or 3 and k=0, . . . , 6, and $n_{CS}{}^{cell}(n_s,k) = \Sigma_{i=0}^{7} c(8N_{symb}{}^{UL} \cdot n_s + 8k+i) \cdot 2^i$, where $N_{symb}{}^{UL}$ is the number of single carrier frequency division multiple access (SC-FDMA) symbols in an uplink slot, i=0, 1, 2, or 3, and k=0, . . . , 6. The pseudo-random sequence generator for pseudo-random sequence c(i) can be initialized with a virtual cell identification (ID) for either a PUCCH, a physical uplink shared channel (PUSCH), or an SRS.

Mapping Between PUCCH Channels and HARQ-ACK States

In another example, the CS used for PUCCH format can be dynamically determined in a respective sTTI based on the HARQ-ACK information according to Table 1 below. More specifically, the state of discontinuous transmission (DTX) in the table can indicate that the UE does not detect any scheduled PDSCH from the gNB in the downlink, wherein the gNB is expecting, for example, an ACK/NACK or DTX feedback from the UE.

TABLE 1

Mapping of HARQ-ACK information to Cyclic Shift

| HARQ-ACK (0) | HARQ-ACK (0), HARQ-ACK (1) | Cyclic Shift used for PUCCH format |
|---|---|---|
| ACK | ACK, ACK | $n_{CS,0}{}^{(x)}$ |
| NACK | ACK, NACK/DTX | $n_{CS,1}{}^{(x)}$ |
|  | NACK/DTX, ACK | $n_{CS,2}{}^{(x)}$ |
|  | NACK/DTX, NACK | $n_{CS,3}{}^{(x)}$ |

In another example, two cyclic shifts, i.e. $n_{CS,0}{}^{(x)}$ and $n_{CS,1}{}^{(x)}$, can be used to convey 2-bit HARQ-ACK information in an sTTI. The ordering information of two cyclic shifts across the two or three symbols can be used according to Table 2 below in order to reduce the UL control overhead.

TABLE 2

Mapping of 2 HARQ-ACK bits to Cyclic Shift

| HARQ-ACK (0), HARQ-ACK (1) | (CS used in 1$^{st}$ symbol(s); CS used in 2$^{nd}$ symbol(s)) |
|---|---|
| ACK, ACK | ($n_{CS,0}{}^{(x)}$, $n_{CS,0}{}^{(x)}$) |
| ACK, NACK/DTX | ($n_{CS,0}{}^{(x)}$, $n_{CS,1}{}^{(x)}$) |
| NACK/DTX, ACK | ($n_{CS,1}{}^{(x)}$, $n_{CS,0}{}^{(x)}$) |
| NACK/DTX, NACK | ($n_{CS,1}{}^{(x)}$, $n_{CS,1}{}^{(x)}$) |

Mapping PUCCH Channels to Physical Resource Block Index

Figure 3:
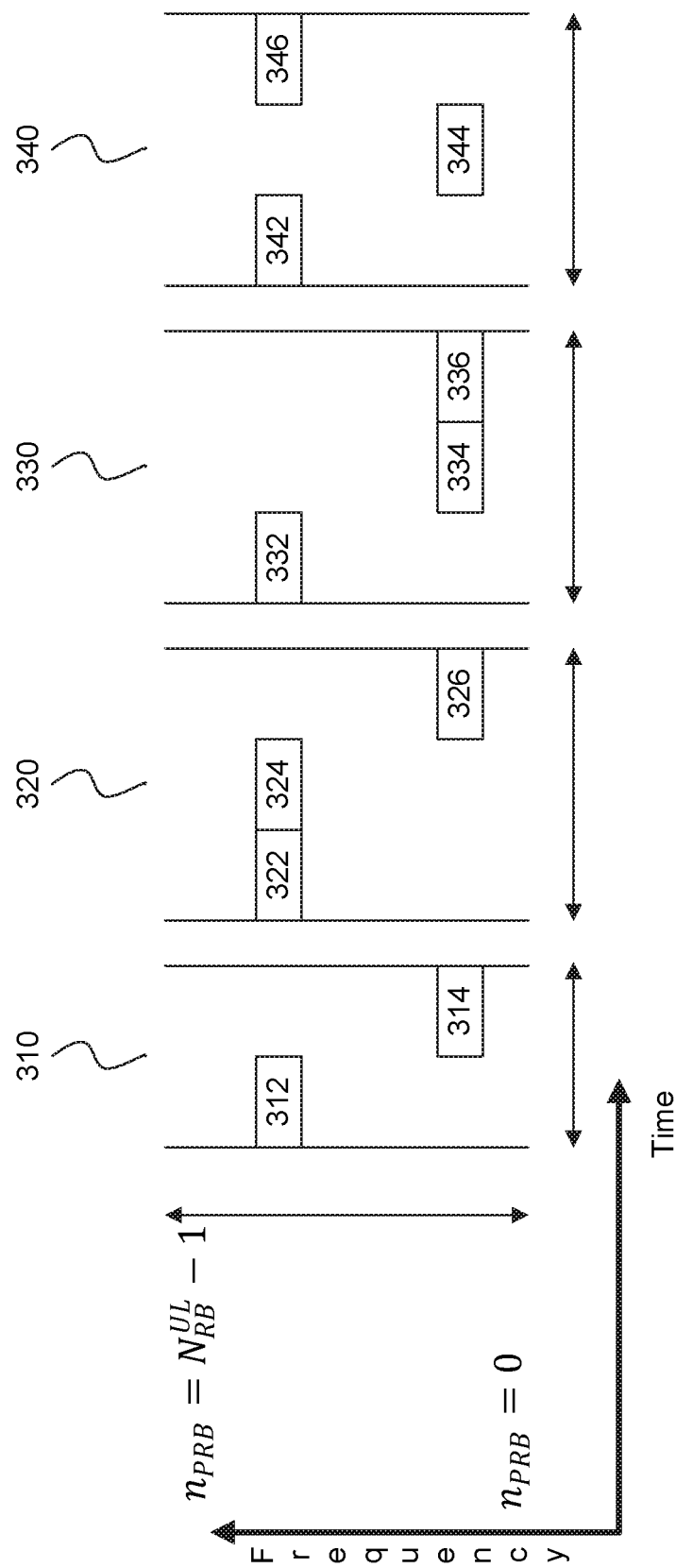
FIG. 3 illustrates mapping physical uplink control channel (PUCCH) to physical resource blocks (PRBs) in accordance with an example.

In another example, as illustrated in FIG. 3, one sTTI can include two or three symbols. Each sTTI can include a first set of symbols and a second set of symbols. The first set of symbols can be based on the frequency position of the PUCCH resource, as shown in Table 2. The second set of symbols can be based on the frequency position of the PUCCH resource, as shown in Table 2. For example, as illustrated in pattern 320, the first set of symbols can include the first symbol 322 and the second symbol 324, and the second set of symbols can include the third symbol 326. Each of the first set of symbols, 322 and 324, can use the CS in the first symbol shown in Table 2. Each of the second set of symbols, 326, can use the CS in the second symbol shown in Table 2.

In another example, the physical resource blocks (PRBs) to be used for PUCCH format in sTTI can be provided by:

$$n_{PRB} = \begin{cases} \lfloor n_{PUCCH}^{(x)} / (2 \times N_{SC}^{RB}) \rfloor & \text{if } (l \bmod 2 = 0) \\ N_{RB}^{UL} - 1 - \left\lfloor \frac{n_{PUCCH}^{(x)}}{2 \times N_{SC}^{RB}} \right\rfloor & \text{if } (l \bmod 2 = 1) \end{cases}$$

where l is 0 or 1 for 2 symbol sTTI and l is 0, 1, or 2 for 3 symbol sTTI. In this example, $n_{PUCCH}{}^{(x)}$ can be a resource index for PUCCH formats 1, 1a, and 1b, and $N_{SC}{}^{RB}$ can be a resource block (RB) size in a frequency domain, expressed as a number of subcarriers, and $N_{RB}{}^{UL}$ can be an uplink bandwidth configuration, expressed in multiples of $N_{SC}{}^{RB}$. In another example, $n_{PRB}$ can be explicitly configured via higher layer signaling.

In this example, m can be $n_{PUCCH}{}^{(x)} / N_{SC}{}^{RB}$, where $n_{PUCCH}{}^{(x)}$ can be a resource index for PUCCH formats 1, 1a, and 1b, and $N_{SC}{}^{RB}$ can be a resource block (RB) size in a frequency domain, expressed as a number of subcarriers.

In another example, pattern 310 can use the PRBs as defined. Pattern 310 can include the symbol 312 and the symbol 314. The PRBs in the symbol 312 can be defined by $$N_{RB}^{UL} - 1 - \left\lfloor \frac{n_{PUCCH}^{(x)}}{2 \times N_{SC}^{RB}} \right\rfloor$$

and the PRBs in the symbol 314 can be defined by $\lfloor n_{PUCCH} / (2 \times N_{SC}{}^{RB}) \rfloor$.

In another example, pattern 340 can use the PRBs as defined. Pattern 340 can include the symbol 342, 344, and 346. The PRBs in the symbols 342 and 346 can be defined by $$N_{RB}^{UL} - 1 - \left\lfloor \frac{n_{PUCCH}^{(x)}}{2 \times N_{SC}^{RB}} \right\rfloor$$

and the PRBs in the symbol 344 can be defined by $\lfloor n_{PUCCH}^{(x)}/(2\times N_{SC}^{RB})\rfloor$. One disadvantage of this pattern 340 can result from frequency hopping within one sTTI because there can be two middle transmit periods between consecutive symbols within an sTTI, i.e. between 342 and 344 and between 344 and 346. This can lead to degraded sPUCCH detection performance, especially on a time dispersive channel.

In another example, to reduce the disadvantages of having two middle transmit periods in a 3-symbol sTTI, patterns 320 and 330 can be used. Pattern 320 can include symbols 322, 324, and 326. Pattern 330 can include symbols 332, 334, and 336.

In this example, the physical resource blocks to be used for PUCCH format in sTTI can be provided by:

$$n_{PRB} = \begin{cases} \lfloor n_{PUCCH}^{(x)}/(2\times N_{SC}^{RB})\rfloor & \text{if } (l=0,1) \\ N_{RB}^{UL} - 1 - \left\lfloor \dfrac{n_{PUCCH}^{(x)}}{2\times N_{SC}^{RB}} \right\rfloor & \text{if } (l=2) \end{cases}$$

where l is 0, 1, or 2 for 3 symbol sTTI. In this example, $n_{PUCCH}^{(x)}$ can be a resource index for PUCCH formats 1, 1a, and 1b, and $N_{SC}^{RB}$ can be a resource block (RB) size in a frequency domain, expressed as a number of subcarriers, and $N_{SC}^{UL}$ can be an uplink bandwidth configuration, expressed in multiples of $N_{SC}^{RB}$. In another example, $n_{PRB}$ can be explicitly configured via higher layer signaling.

In another example, pattern 320 can use the PRBs as defined. Pattern 320 can include the symbols 322, 324, and 326. The PRBs in the symbol 322 and 324 can be defined by $\lfloor n_{PUCCH}^{(x)}/(2\times N_{SC}^{RB})\rfloor$ and the PRBs in the symbol 326 can be defined by $$N_{RB}^{UL} - 1 - \left\lfloor \dfrac{n_{PUCCH}^{(x)}}{2\times N_{SC}^{RB}} \right\rfloor.$$

In another example, the physical resource blocks to be used for PUCCH format in sTTI can be provided by:

$$n_{PRB} = \begin{cases} \lfloor n_{PUCCH}^{(x)}/(2\times N_{SC}^{RB})\rfloor & \text{if } (l=0) \\ N_{RB}^{UL} - 1 - \left\lfloor \dfrac{n_{PUCCH}^{(x)}}{2\times N_{SC}^{RB}} \right\rfloor & \text{if } (l=1,2) \end{cases}$$

where l is 0, 1, or 2 for 3 symbol sTTI. In another example, $n_{PRB}$ can be explicitly configured via higher layer signaling. In this example, $n_{PUCCH}^{(x)}$ can be a resource index for PUCCH formats 1, 1a, and 1b, and $N_{SC}^{RB}$ can be a resource block (RB) size in a frequency domain, expressed as a number of subcarriers, and $N_{RB}^{UL}$ can be an uplink bandwidth configuration, expressed in multiples of $N_{SC}^{RB}$. In another example, $n_{PRB}$ can be explicitly configured via higher layer signaling.

In another example, pattern 330 can use the PRBs as defined. Pattern 330 can include the symbols 332, 334, and 336. The PRBs in the symbol 332 can be defined by $\lfloor n_{PUCCH}^{(x)}/(2\times N_{SC}^{RB})\rfloor$ and the PRBs in the symbol 334 and 336 can be defined by $$N_{RB}^{UL} - 1 - \left\lfloor \dfrac{n_{PUCCH}^{(x)}}{2\times N_{SC}^{RB}} \right\rfloor.$$

In another example, symbols can be mapped to PRBs according to any of the patterns discussed above for a first subslot and a last subslot of a subframe for an sPUCCH. In another example, symbols can be mapped to PRBs according to any of the patterns discussed above for subslots not including the first subslot and the last subslot of a subframe. These subslots can include the second subslot, the third subslot, the fourth subslot, and the fifth subslot.

In another example, the first subslot of a subframe and the last subslot of a subframe can each comprise 3 symbols in the subframe. In another example, the second subslot, the third subslot, the fourth subslot, and the fifth subslot can each comprises 2 symbols in the subframe.

In another example, a resource set can be encoded via higher layer signaling, such as RRC signaling.

In another example, the mapping of modulation UCI symbol for PUCCH format x is illustrated in FIG. 3 with the corresponding frequency hopping patterns. In the case of simultaneous transmission of SRS and HARQ-ACK on a PUCCH format, a shortened PUCCH format with two symbols can be used. In this example, the last symbol in the 3-symbol sTTI can be empty.

Sending HARQ-ACK and SR Information in the Same sTTI

In another example, a UE can send up to 2 bits of HARQ-ACK and SR information in the same sTTI on one selected PUCCH resource assigned for HARQ-ACK transmission or on one selected PUCCH resource assigned for SR transmission at least based on the HARQ-ACK bit numbers and the SR information after performing a bundling operation for the HARQ-ACK bits.

In one example, separate PUCCH resources can be assigned independently for SR and HARQ-ACK bits transmission, and can be denoted respectively as $n_{PUCCH,i}^{(x),SR}$ and $n_{PUCCH,j}^{(x),HARQ-ACK}$ where (x) is the format number and both i and j are positive integers. The UE can transmit the HARQ-ACK on one of its assigned HARQ-ACK PUCCH resources $n_{PUCCH,j}^{(x),HARQ-ACK}$ for a negative SR transmission or a positive SR transmission based on the HARQ-ACK bit numbers.

In another example, the SR information can be coded as 1 bit. In this example, the 1-bit SR and the 2 bit HARQ-ACK can be sequentially concatenated and transmitted on the resources of different PUCCH formats that can convey more than 2 bits of UCI information.

In another example, there can be a condition for bundling the HARQ-ACK bits and transmitting the HARQ-ACK bits in the PUCCH resource assigned for SR transmission. This condition, in the case of a positive SR, is based on the number of PUCCH channels assigned for SR transmission and the amount of PUCCH resources used for HARQ-ACK transmission in an sTTI.

In one example, when HARQ-ACK bits number $O_{HARQ-ACK}=2$ and two sequence-based PUCCH resource are assigned for SR transmission, the UE can generate one HARQ-ACK bit by bundling the ACKs or NACKs or a combination of ACKs and NACKs with a logical AND operation. The UE can send the bundled HARQ-ACK information one of the two sequence-based PUCCH resources assigned for SR transmission.

In another example, the one HARQ-ACK bit information can be generated from the two HARQ-ACK bits in accordance with Table 3.

TABLE 3

Transmission of 2-bit HARQ-ACK bits using one PUCCH SR Resource

| | |
|---|---|
| HARQ-ACK (0), HARQ-ACK (1) | $n_{PUCCH,i}^{(x),SR}$ |
| (ACK, ACK) or (ACK, NACK/DTX) | $n_{PUCCH,0}^{(x),SR}$ |
| Others | $n_{PUCCH,1}^{(x),SR}$ |

In another example, two HARQ-ACK bits can be transmitted along with an active SR without bundling the HARQ-ACK bits. In the case of a negative SR, a sequence for HARQ-ACK bits can be selected and transmitted as though there is no simultaneous SR transmission. In the case of a positive SR, the UE can transmit two sequences as shown in Table 4.

TABLE 4

Mapping of 2-bits HARQ-ACK information and SR to CS

| HARQ-ACK(0), HARQ-ACK(1) | SR | CS used for PUCCH format |
|---|---|---|
| ACK, ACK | Negative | $n_{CS,0}^{(x)}$ |
| ACK, NACK/DTX | Negative | $n_{CS,1}^{(x)}$ |
| NACK/DTX, ACK | Negative | $n_{CS,2}^{(x)}$ |
| NACK/DTX, NACK | Negative | $n_{CS,3}^{(x)}$ |
| ACK, ACK | Positive | $n_{CS,0}^{(x)}$ and $n_{CS,1}^{(x)}$ |
| ACK, NACK/DTX | Positive | $n_{CS,1}^{(x)}$ and $n_{CS,2}^{(x)}$ |
| NACK/DTX, ACK | Positive | $n_{CS,2}^{(x)}$ and $n_{CS,3}^{(x)}$ |
| NACK/DTX, NACK | Positive | $n_{CS,3}^{(x)}$ and $n_{CS,0}^{(x)}$ |

In another example, the transmission of the two sequences as shown in Table 4 can reduce inter-modulation distortion when compared to a case in which the sequence for SR is transmitted together with the sequence for HARQ-ACK on possibly separate frequency resources. Other combinations of two cyclic shifts for cases of positive SR and 2-bits HARQ-ACK transmission are possible.

Figure 4:
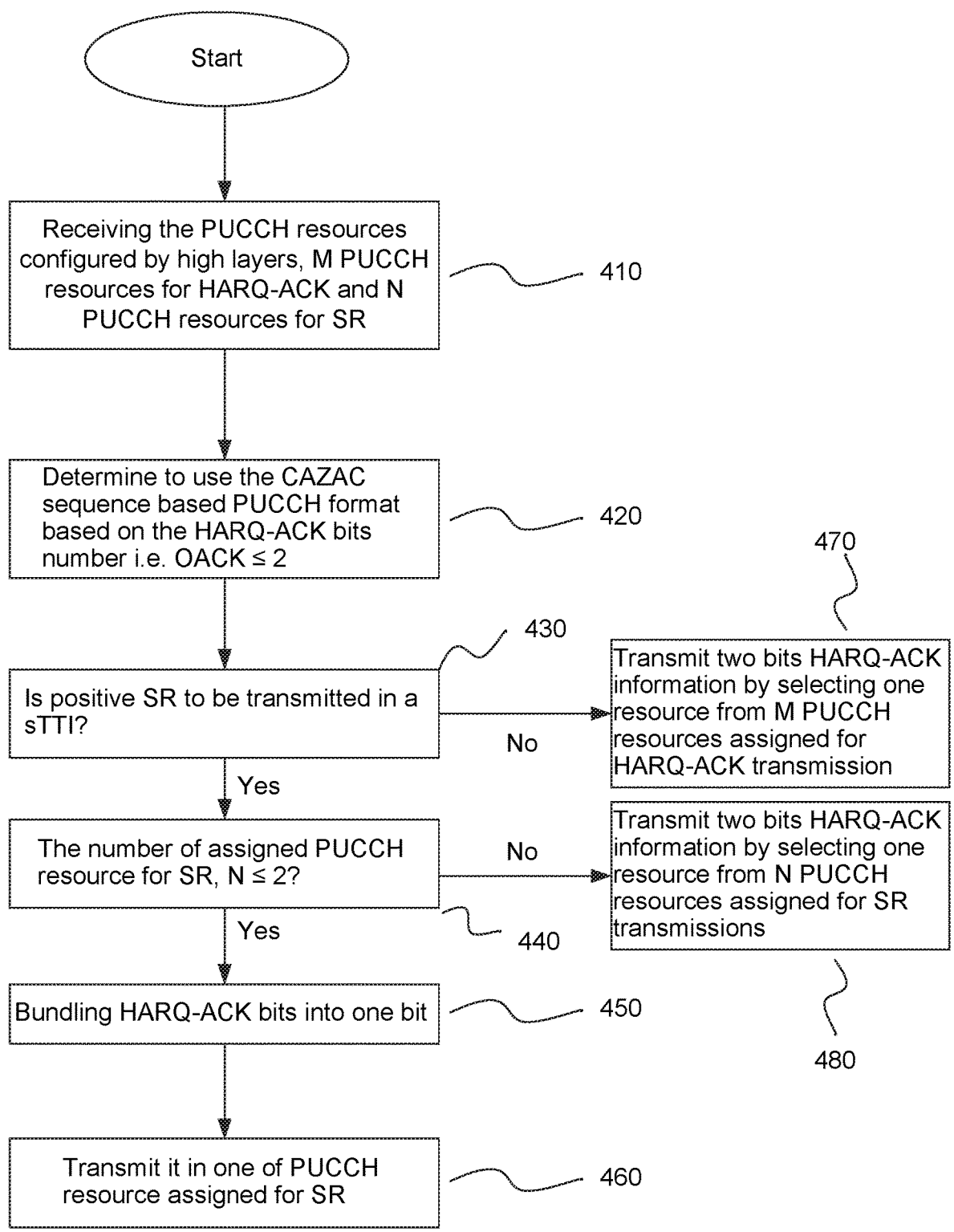
FIG. 4 depicts functionality of hybrid automatic repeat request acknowledgment (HARQ-ACK) bundling in accordance with an example.

FIG. 4 depicts functionality of HARQ-ACK bundling in accordance with an example. In one operation, the UE can receive the PUCCH resources configured by higher layers, in which M PUCCH resources are assigned for HARQ-ACK and N PUCCH resources are assigned for SR, as shown in block 410. In another operation, the UE can determine to use the CAZAC sequence based PUCCH format based on the number of HARQ-ACK bits, i.e. $O_{HARQ-ACK} \leq 2$, as shown in block 420. In another operation, the UE can determine if a positive SR is to be transmitted in a sTTI, as shown in block 430. In another operation, if a positive SR is not to be transmitted in a sTTI, then the UE can transmit two bits HARQ-ACK information by selecting one resource from the M PUCCH resources assigned for HARQ-ACK transmission, as shown in block 470. In another operation, if a positive SR is to be transmitted in a sTTI, the UE can determine if the number of assigned PUCCH resources for SR is less than or equal to 2, as shown in block 440. In another operation, if the number of assigned PUCCH resources for SR is greater than 2, then the UE can transmit two bits of HARQ-ACK information by selecting one resource from the N PUCCH resources assigned for SR transmissions, as shown in block 480. In another operation, if the number of assigned PUCCH resources for SR is less than or equal to 2, then the UE can bundle the HARQ-ACK bits into one bit, as shown in block 450. In another operation, the UE can transmit in one of the PUCCH resources assigned for SR, as shown in block 460.

In another example, the number of PUCCH resources for SR transmission can be predefined or can be configured by higher layers. In another example, the network can decide, e.g. either 2 or 4 PUCCH resources.

In another example, the UE can transmit 2-bits of HARQ-ACK information and 1-bit of SR information by jointly using the two PUCCH resources assigned for HARQ-ACK transmission, i.e. $n_{PUCCH,j}^{(x),HARQ-ACK}$ where j is 0 and 1, and one PUCCH resource assigned for SR transmission, i.e. $n_{PUCCH,i}^{(x),SR}$ where i is 0, as shown in Table 5, where P-SR refers to a positive SR and N-SR refers to a negative SR.

TABLE 5

Transmission of 2 HARQ-ACK bits and SR information

| HARQ-ACK (0), HARQ-ACK (1), SR | CS used in first set of symbols, CS used in second set of symbols |
|---|---|
| ACK, ACK, N-SR | $n_{CS,0}^{(x),HARQ-ACK}, n_{CS,0}^{(x),HARQ-ACK}$ |
| ACK, ACK, P-SR | $n_{CS,0}^{(x),HARQ-ACK}, n_{CS,1}^{(x),HARQ-ACK}$ |
| ACK, NACK/DTX, P-SR | $n_{CS,0}^{(x),HARQ-ACK}, n_{CS,0}^{(x),SR}$ |
| ACK, NACK/DTX, N-SR | $n_{CS,1}^{(x),HARQ-ACK}, n_{CS,0}^{(x),HARQ-ACK}$ |
| NACK/DTX, ACK, P-SR | $n_{CS,1}^{(x),HARQ-ACK}, n_{CS,0}^{(x),HARQ-ACK}$ |
| NACK/DTX, ACK, N-SR | $n_{CS,1}^{(x),HARQ-ACK}, n_{CS,0}^{(x),SR}$ |
| NACK/DTX, NACK/DTX, P-SR | $n_{CS,0}^{(x),SR}, n_{CS,0}^{(x),SR}$ |
| NACK, NACK/DTX, N-SR | $n_{CS,0}^{(x),SR}, n_{CS,0}^{(x),HARQ-ACK}$ |
| DTX, NACK/DTX, N-SR | $n_{CS,0}^{(x),SR}, n_{CS,1}^{(x),HARQ-ACK}$ |

In another example, two PUCCH resources, denoted as $n_{CS,0}^{(x)}$ and $n_{CS,1}^{(x)}$, can be transmitted to a UE through higher layer signaling and can be used for both HARQ-ACK transmission and positive SR transmission based on Table 6. In this approach, the same CS can be used for all symbols in an sTTI in case of negative SR.

TABLE 6

Transmission of 2 HARQ-ACK bits and SR information

| HARQ-ACK (0), SR | CS used in first set of symbols, CS used in second set of symbols |
|---|---|
| ACK, N-SR | $n_{CS,0}^{(x)}, n_{CS,0}^{(x)}$ |
| ACK, P-SR | $n_{CS,0}^{(x)}, n_{CS,1}^{(x)}$ |
| NACK/DTX, P-SR | $n_{CS,1}^{(x)}, n_{CS,0}^{(x)}$ |
| NACK/DTX, N-SR | $n_{CS,1}^{(x)}, n_{CS,1}^{(x)}$ |

In another example, the SR information and the HARQ-ACK information can be simultaneously transmitted within a RB with different PUCCH resources i.e. separate cyclic shifts. When SR and HARQ-ACK information is configured with different RBs, the SR and HARQ-ACK information can be transmitted simultaneously in different RBs.

In another example, when a UE transmits up to 2 bits of HARQ-ACK information and SR information in the same sTTI, the UE can transmit the SR in the first symbol and the HARQ-ACK in the remaining 1 or 2 symbols. This can relax the UE processing time for DL data demodulation and decoding by one or more symbol duration. In another example, the UE can transmit the SR in the last symbol while transmitting the HARQ-ACK in the first 1 or 2 symbols. These examples can be applicable to 5G New Radio (NR) when the UE can transmit up to 2 bits of HARQ-ACK information and SR information on NR PUCCH with short duration.

In one example, when the UE transmits both HARQ-ACK information and SR information in the 1-symbol or 2-symbol short PUCCH, the UE can transmit the HARQ-ACK on one of its assigned HARQ-ACK short PUCCH resources for a negative SR. In one example, when the UE transmits both HARQ-ACK information and SR information in the 1-symbol or 2-symbol short PUCCH, the UE can transmit the bundled HARQ-ACK information on one of its assigned PUCCH resources for a positive SR. based on the HARQ-ACK bit number.

In another example, the UE can simultaneously transmit the 1 or 2 bit HARQ-ACK feedback and SR in the same symbol or set of symbols on two short PUCCHs. The UE can transmit these two PUCCHs using frequency division multiplexing (FDM) or code division multiplexing (CDM). For example, the UE can transmit the HARQ-ACK feedback and SR in two PUCCHs in different frequency resources.

Figure 5:
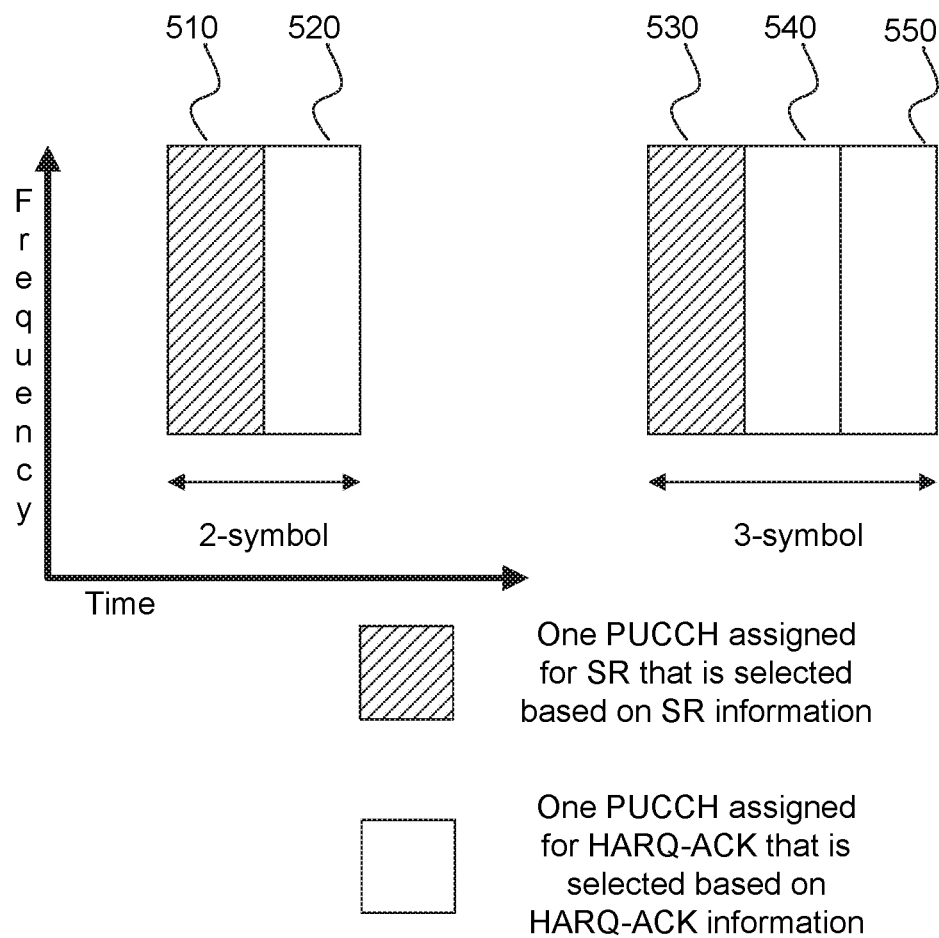
FIG. 5 illustrates time division multiplexing (TDM) in accordance with an example.

FIG. 5 illustrates time division multiplexing (TDM) in accordance with an example. In this example, when 2-symbol or 3-symbol short PUCCH is used to carry HARQ-ACK information and SR information, TDM can be used. In this example, 510 shows a PUCCH assigned for SR that is selected based on SR information and 520 shows a PUCCH assigned for HARQ-ACK that is selected based on HARQ-ACK information. In another example, 530 shows a PUCCH assigned for SR that is selected based on SR information, and 540 and 550 each show a PUCCH assigned for HARQ-ACK that is selected based on HARQ-ACK information. In these examples, UE processing time for DL data demodulation and decoding can be relaxed by one more symbol duration.

SR Index Indication in Combined UCI Carried by PUCCH

For NR, UCI can include SR, HARQ-ACK feedback, channel state information (CSI) report, and beam related information. The CSI report can include e.g., channel quality indicator (CQI), pre-coding matrix indicator (PMI), and rank indicator (RI). The beam related information can include: (1) beam state information (BSI), which can include beam index and beam reference signal received power (L1-RSRP), and/ or (2) beam refinement information (BRI), which may include beam index and L1-RSRP measured from the beam refinement reference signal (BRRS).

Furthermore, the SR can encode quality of service (QoS) attributes related to reliability targets, latency budget, or information on packet size for NR. This information may be used to properly handle SR at the gNB. For example, a UE can have traffic that uses URLLC or only low latency communication (LLC) without strict reliability targets. To allow the gNB to identify services with different QoS constraints requested from the UE, a UE can be configured with multiple PUCCH resources for SR. The multiple PUCCH resources for SR can be mapped to priority or numerology or transmission time interval (TTI) of the logical channel (LCH) that triggered the SR. Multi-bit SR may not be supported for NR.

Figure 6:
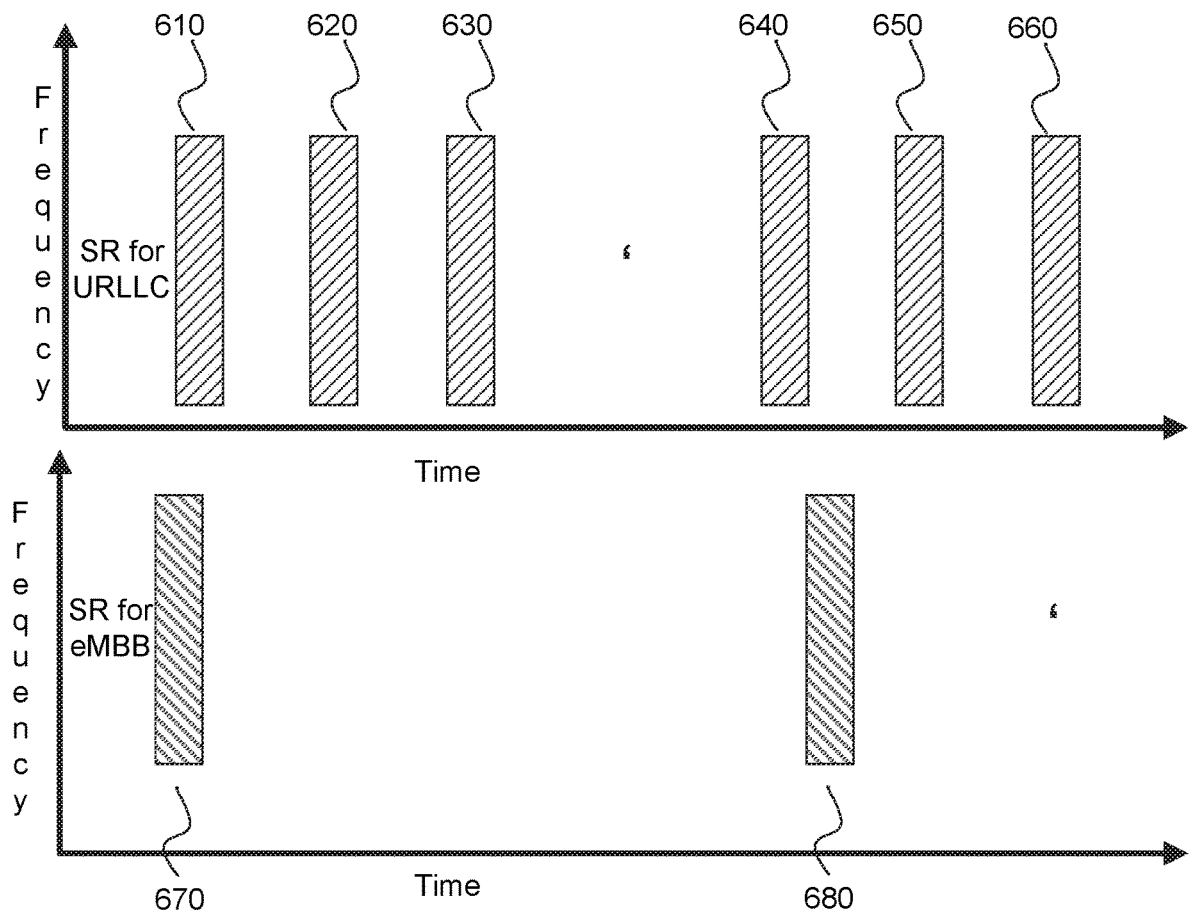
FIG. 6 illustrates different periodicities of scheduling request (SR) resources in accordance with an example.

In another example, FIG. 6 illustrates different periodicities of SR resources for services with different QoS constraints. For a low latency application, e.g., URLLC, SR resources with shorter periodicity can be configured. For example, the time interval among each of 610, 620, 630, 640, 650, and 660 can be short. In this example, the time interval between SR resources can be smaller than a slot. As such, for URLLC service, a UE can be configured with SR resources with symbol-level periodicity to achieve the latency constraints. In another example, for eMBB, SR resources can be configured with slot level periodicity. As illustrated in FIG. 6, the time interval between 670 and 680 is larger than the time interval between 610 and 620.

In another example, in 3GPP LTE, the SR can collide with the CSI report. In this example, the SR can be combined with the HARQ-ACK feedback and CSI report. In this example, 1-bit SR information, i.e. positive SR or negative SR, can be explicitly included in the PUCCH transmission. In another example, in NR, a UE can be configured with multiple SR resources. Moreover, symbol level periodicity (e.g. URLLC) or slot level periodicity (e.g. eMBB) can be configured for different services and applications.

Figure 7:
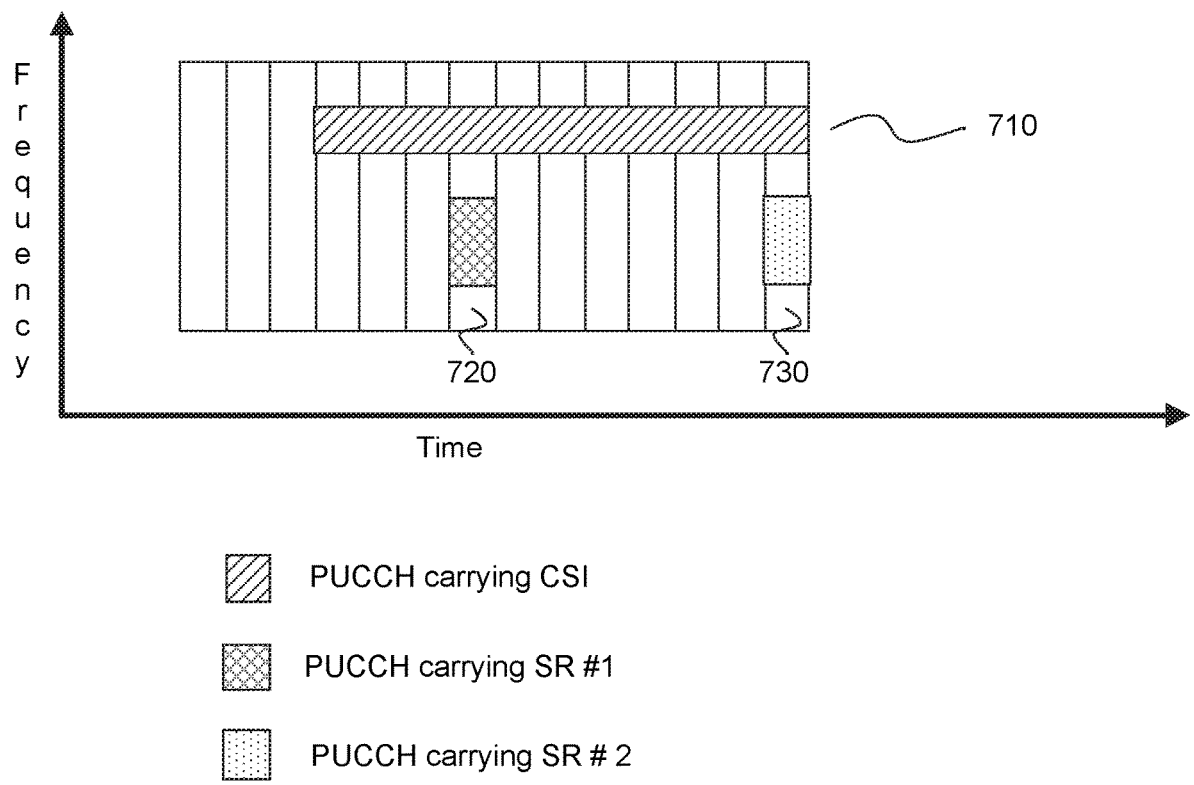
FIG. 7 illustrates collisions between channel station information (CSI) and multiple SR resources in accordance with an example.

In another example, as illustrated in FIG. 7, multiple SR resources can collide with other UCI types such as the CSI report of beam-related information. If the UE includes one-bit information for the SR on PUCCH, the gNB may not be able to identify which SR is triggered by a UE. For example, a PUCCH carrying CSI 710 can collide in time with a PUCCH carrying SR #1 720. In another example, a PUCCH carrying CSI 710 can collide in time with a PUCCH carrying SR #2 730.

Figure 8:
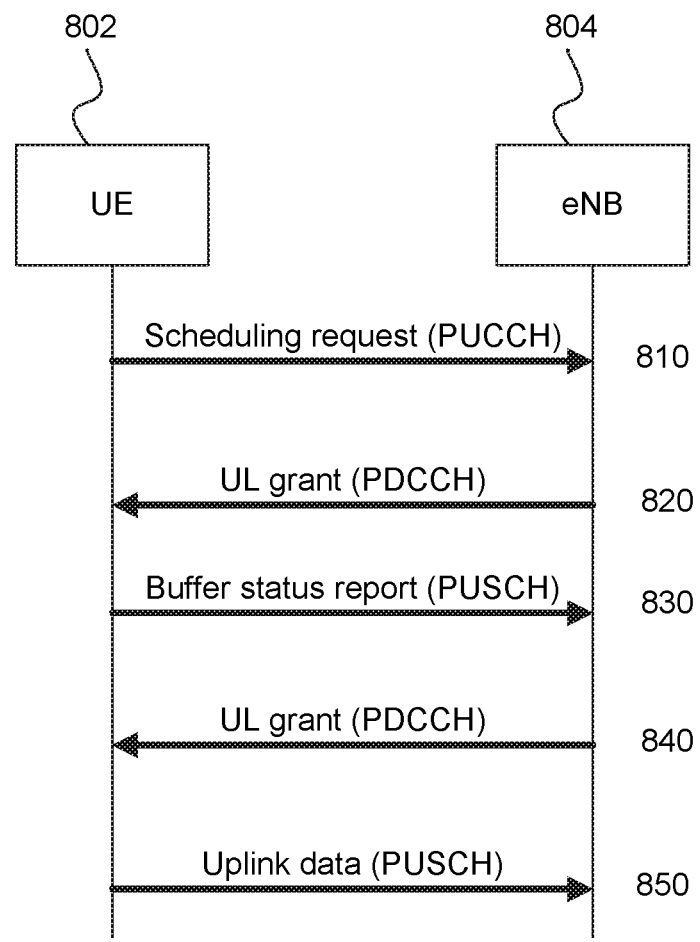
FIG. 8 illustrates uplink data transmission in accordance with an example.

In another example, as illustrated in FIG. 8, uplink data can be transmitted according to a procedure. When the UE 802 intends to transmit data in the uplink, it can request resources using PUCCH format 1 for a scheduling request, as shown in operation 810. After successful detection of SR, the eNB 804 can transmit the PDCCH with downlink control information (DCI) format containing an uplink grant to allocate the uplink resource, as shown in operation 820. The UE 802 can send the buffer status report (BSR) on the physical uplink shared channel (PUSCH) in the allocated uplink resource, as shown in operation 830. A BSR medium access control (MAC) control element (CE) can be carried in a MAC protocol data unit (PDU), which can be used to inform the eNB 804 on the amount of the data in UE's 802 buffer for one specific logical channel group (LCG) to be transmitted. Based on the BSR information, the eNB 804 can allocate the appropriate resources and modulation and coding scheme (MCS) that is included in the uplink grant, as shown in operation 840. After receiving the UL grant, the UE 802 can transmit the UL data on the PUSCH, as shown in operation 850.

Figure 9:
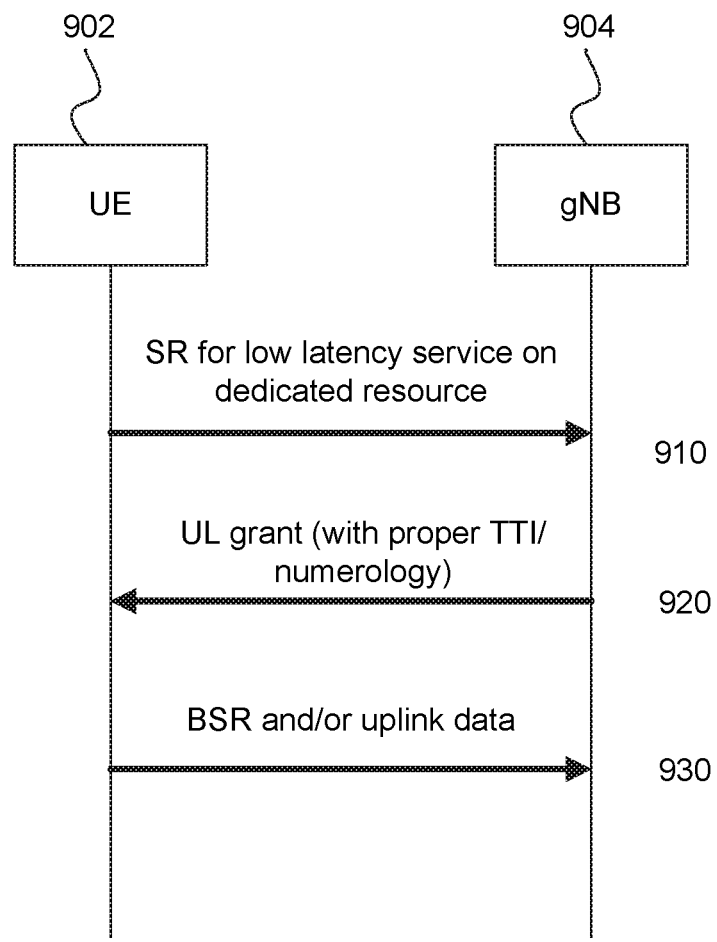
FIG. 9 illustrates uplink data transmission in accordance with an example.

In another example, in NR, a unique mapping between service or LCH and SR can be defined in order to allow the gNB and UE to differentiate the SR associated with a given service, which can reduce the ambiguity when the gNB receives multiple SR from the same UE within a short time window In another example, as illustrated in FIG. 9, after successful detection of SR on dedicated resources for a low latency application, the gNB 904 can allocate resources for BSR and uplink data transmission with appropriate numerology or TTI, e.g., using a larger subcarrier spacing or the same numerology with shorter TTI, as shown in operation 910. After receiving the UL grant, the UE 902 can derive the corresponding LCHs according to TTI and numerology information and mapping rules between the SR configuration and LCH, as shown in operation 920. In another example, when the data transmission duration is short or the configured numerology for data transmission is large, based on the mapping table between TTI/numerology and LCH, the UE 902 can derive the LCH to be transmitted in the PUSCH. The UE can transmit the BSR and/or UL data on the PUSCH, as shown in operation 930.

As previously discussed in relation to FIG. 7, multiple SR resources can collide in time with other UCI types, e.g., CSI report or beam related report. When the UE includes only one-bit information for SR on PUCCH, the gNB may not be able to identify which SR is triggered by the UE. In this example, multiple SR resources can partially or fully overlap in time with the PUCCH carrying CSI or beam related report.

In one example, a bitmap for SR can be included in the combined UCI which can include SR, and/or HARQ-ACK, and/or CSI and/or beam related report. The size of the bitmap can be predefined of configured by higher layers via minimum system information (MSI), NR remaining minimum system information (RMSI), NR system information block (SIB) or radio resource control (RRC) signaling. The size of the bitmap can be defined in a cell-specific of UE specific manner.

In one example, the size of the bitmap can be determined based on the number of configured SR resources that collide for a UE. In another example, the size of the bitmap can vary based on the number of configured SR resources in a corresponding slot. In this example, in a slot with two SR resources for the UE, the bitmap in the combined UCI can have two bits and in another slot with four SR resources for the UE, four bits can be used for the bitmap. There can be other methods to indicate a positive SR that include adjusting the size slot by slot based on the number of SR resources for the UE. The SR resources can be configured by the network, and the network can provide both the gNB and the UE with the same bitmap size in the combined UCI.

In another example, each bit in the bitmap can represent the state for the corresponding SR in multiple SR configurations. In one example, the bit "1" can indicate a positive SR for the corresponding SR resource, while the bit "0" can indicate a negative SR for the corresponding SR resource. In one example, when a UE is configured with four SR resources, the bitmap in the combined UI can be "0100." This bitmap of "0100" can indicate that the UE transmits the positive SR for the corresponding second SR resource because the second bit of the bitmap is a "1" and the remaining three bits of the bitmap are "0."

In another example, a UE can transmit multiple SRs at the same time or in the same slot. In this example, the UE can indicate multiple positive SRs in the bitmap. This indication can depend on UE capability or can be configured by higher layer signaling in a UE specific manner via RRC signaling. In one example, when a UE is configured with four SR resources, then the bitmap in the combined UCI of "0101" can indicate that the UE transmits positive SRs for the corresponding second and fourth resources.

In another example a field or state for SR index can be included in the combined UCI which can include SR, and/or HARQ-ACK, and/or CSI and/or beam related report. The SR index can be configured by higher layer signaling such as RRC signaling. The bit-width of the SR index can be predefined of configured by higher layers via MSI, RMSI, SIB, or RRC signaling. In one example, the bit-width of the SR index can be determined based on the number of configured SR resources that collide for a UE.

In another example, when a UE is configured with four SR resources and the UE only transmits one SR corresponding to the second SR resource within a slot, the UE can include the field "01" in the combined UCI report in PUCCH when multiple SR resources collide with other UCI types.

In another example the SR field or state can be appended or prepended to either the HARQ-ACK information bits in the UCI or to the CSI information bits in the UCI.

In another example, the UE can assume that multiple SR resources are configured in different slots. In this example, the UE can include one bit in the combined UCI report. Based on the information for the corresponding SR resource configuration, the gNB can determine which SR is triggered.

In another example, multiple SR configurations can collide with other UCI types. In this example, when the UE transmits one or more SRs, the UE can encode SR information into a PUCCH transmission carrying the combined UCI report. In one example, the SR index can be carried by demodulation reference signal (DM-RS) sequences used for transmission of the PUCCH. In this example, four DM-RS sequences can be configured by higher layers via RRC signaling. In this example, when the UE transmits the PUCCH, the UE can select one of the four DM-RS sequences based on the SR index from the multiple configured SR resources, including a sequence that can correspond to a negative SR.

In another example, SR index information can be carried by scrambling sequences for encoded UCI information bits for the transmission of PUCCH. In this example, a scrambling seed can be initialized as a function of the SR index used for transmission of the PUCCH. For a negative SR, the scrambling seed can be initialized as a function of a specified input to an initialization function.

In another example, SR index information can be carried by cyclic redundancy check (CRC), which can be masked with a codeword representing SR index for the transmission of PUCCH carrying the combined UCI report. In one example, when a negative SR is used, a codeword representing a negative SR can be used to mask the CRC.

SR Index Indication in PDCCH Carrying UL Grant

In one example, after the UE sends one or more SRs within a short time interval or in the same slot, the gNB can process multiple SRs at the same time. The gNB can transmit the UL grant via physical downlink control channel (PDCCH) which can include SR resource index information, which can reduce ambiguity that can arise when the gNB receives multiple SRs from the same UE within a short time window.

In another example, when the gNB transmits a DCI carrying an UL grant for scheduling an UL transmission, SR index information from multiple SR configurations can be encoded in the transmission of PDCCH. In one example, SR index information can be carried in the scrambling of PDCCH carrying the UL grant. In this example, the scrambling seed can be initialized as a function of the SR index used for transmission of the PDCCH.

In another example, SR index information can be carried by CRC on a PDCCH transmission. The SR index information can be masked with a codeword representing the SR index, and can be masked on top of a cell radio network temporary identifier (C-RNTI).

Figure 10:
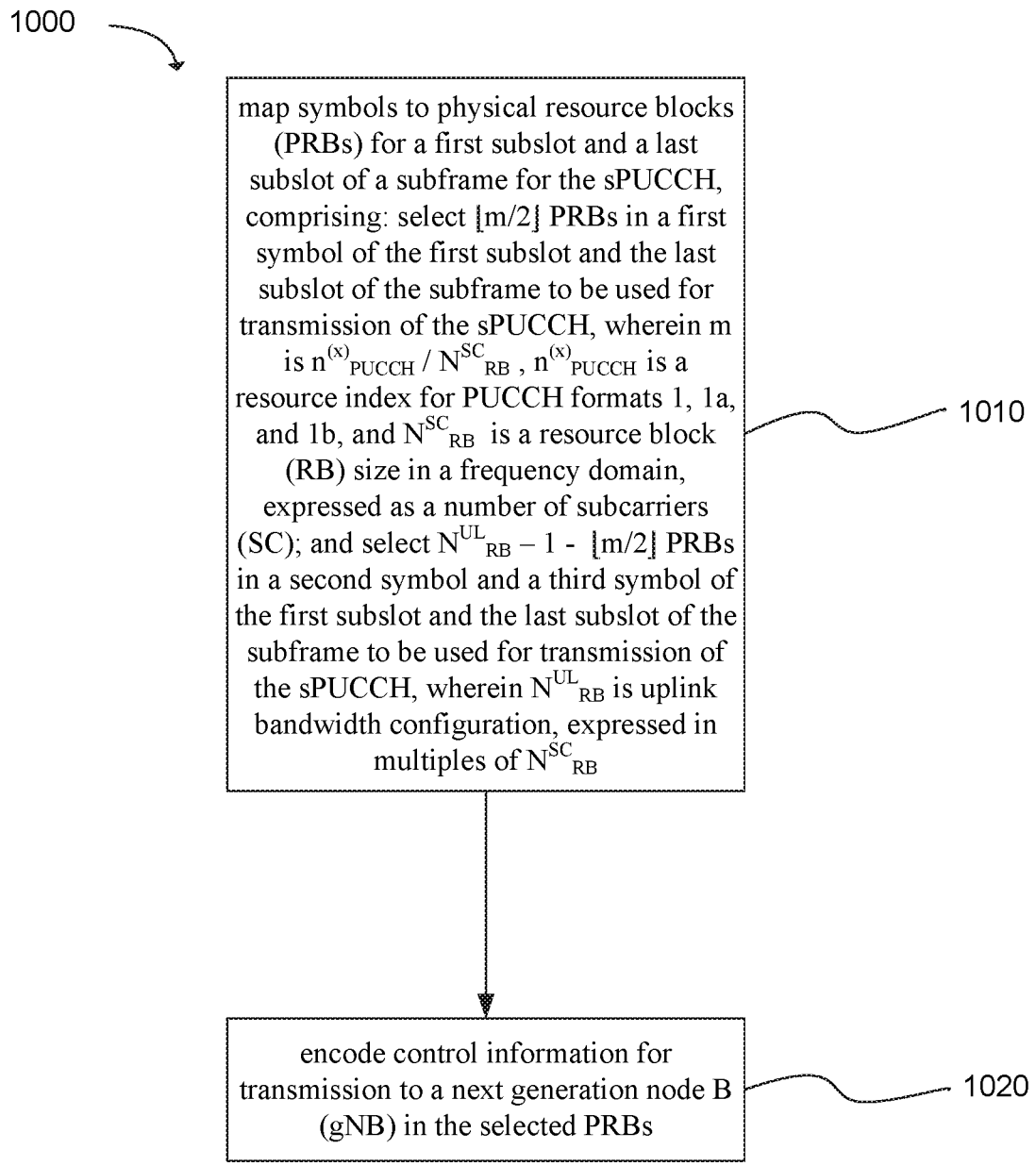
FIG. 10 depicts functionality of a user equipment (UE) operable for transmission of a shortened physical uplink control channel (sPUCCH) in accordance with an example.

Another example provides functionality 1000 of a user equipment (UE) operable for transmission of a shortened physical uplink control channel (sPUCCH), as shown in FIG. 10. The UE can comprise one or more processors. The one or more processors can be configured to map symbols to physical resource blocks (PRBs) for a first subslot and a last subslot of a subframe for the sPUCCH, comprising: select $$\left\lfloor \frac{m}{2} \right\rfloor$$

PRBs in a first symbol of the first subslot and the last subslot of the subframe to be used for transmission of the sPUCCH, wherein m is $$\frac{n_{PUCCH}^{(s)}}{N_{SC}^{RB}},$$

$n_{PUCCH}^{(x)}$ is a resource index for PUCCH formats 1, 1a, and 1b, and $N_{SC}^{RB}$ is a resource block (RB) size in a frequency domain, expressed as a number of subcarriers (SC); and select $$N_{RB}^{UL} - 1 - \left\lfloor \frac{m}{2} \right\rfloor$$

PRBs in a second symbol and a third symbol of the first subslot and the last subslot of the subframe to be used for transmission of the sPUCCH, wherein $N_{RB}^{UL}$ is uplink bandwidth configuration, expressed in multiples of $N_{SC}^{RB}$, as in block 1010. The one or more processors can be configured to encode control information for transmission to a next generation node B (gNB) in the selected PRBs, as in block 1020. In addition, the UE can comprise a memory interface configured to retrieve the control information from a memory.

Figure 11:
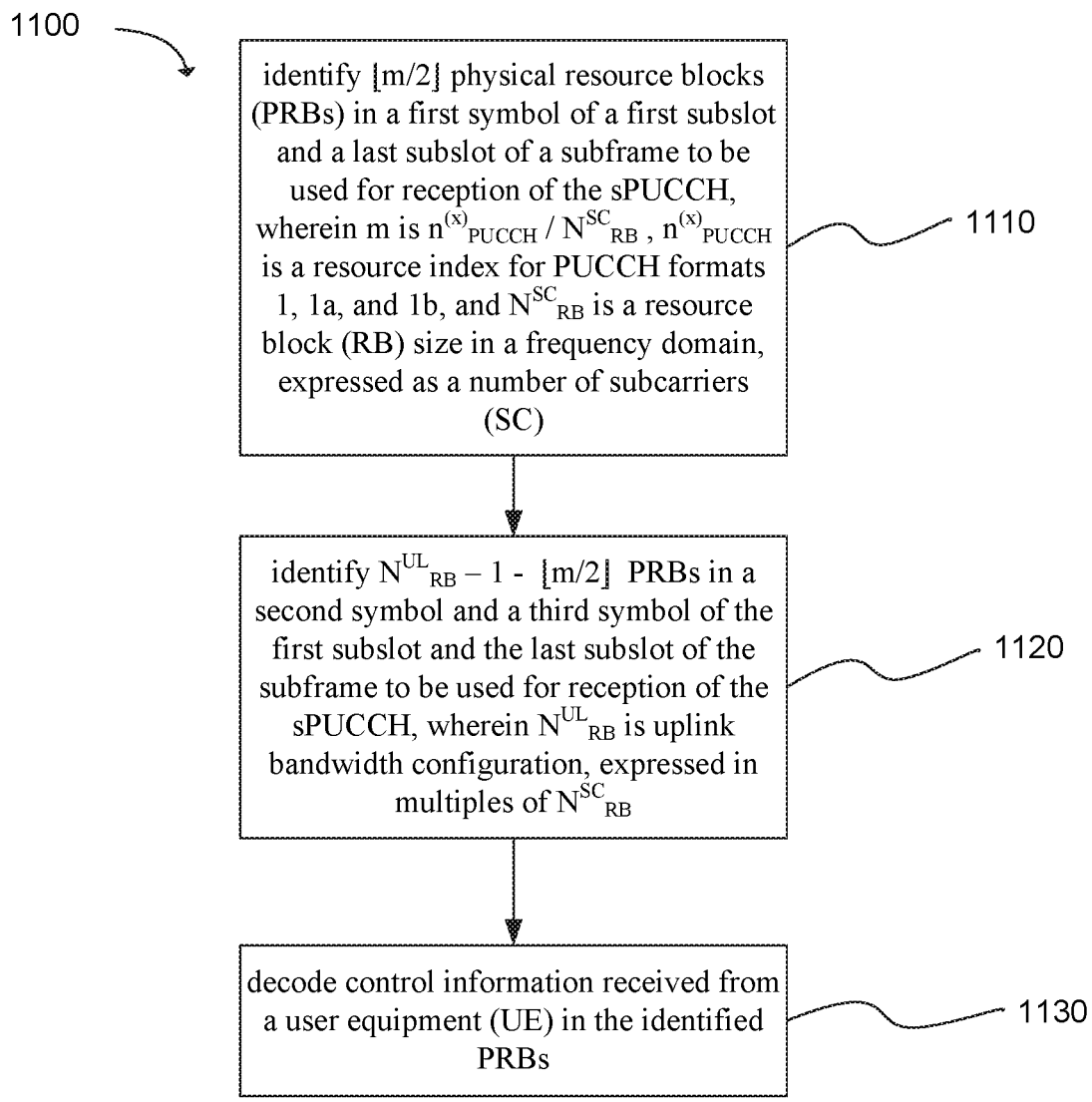
FIG. 11 depicts functionality of a next generation node B (gNB) operable to receive a shortened physical uplink control channel (sPUCCH) in accordance with an example.

Another example provides functionality 1100 of a next generation node B (gNB) operable to receive a shortened physical uplink control channel (sPUCCH), as shown in FIG. 11. The gNB can comprise one or more processors. The one or more processors can be configured to identify $$\left\lfloor \frac{m}{2} \right\rfloor$$

physical resource blocks (PRBs) in a first symbol of a first subslot and a last subslot of a subframe to be used for reception of the sPUCCH, wherein m is $$\frac{n_{PUCCH}^{(x)}}{N_{SC}^{RB}},$$

$n_{PUCCH}^{(x)}$ is a resource index for PUCCH formats 1, 1a, and 1b, and $N_{SC}^{RB}$ is a resource block (RB) size in a frequency domain, expressed as a number of subcarriers (SC), as in block 1110. The one or more processors can be configured to identity $$N_{RB}^{UL} - 1 - \left\lfloor \frac{m}{2} \right\rfloor$$

PRBs in a second symbol and a third symbol of the first subslot and the last subslot of the subframe to be used for reception of the sPUCCH, wherein $N_{RB}^{UL}$ is uplink bandwidth configuration, expressed in multiples of $N_{SC}^{RB}$, as in block 1120. The one or more processors can be configured to decode control information received from a user equipment (UE) in the identified PRBs, as in block 1130. In addition, the gNB can comprise a memory interface configured to send the control information to a memory.

Figure 12:
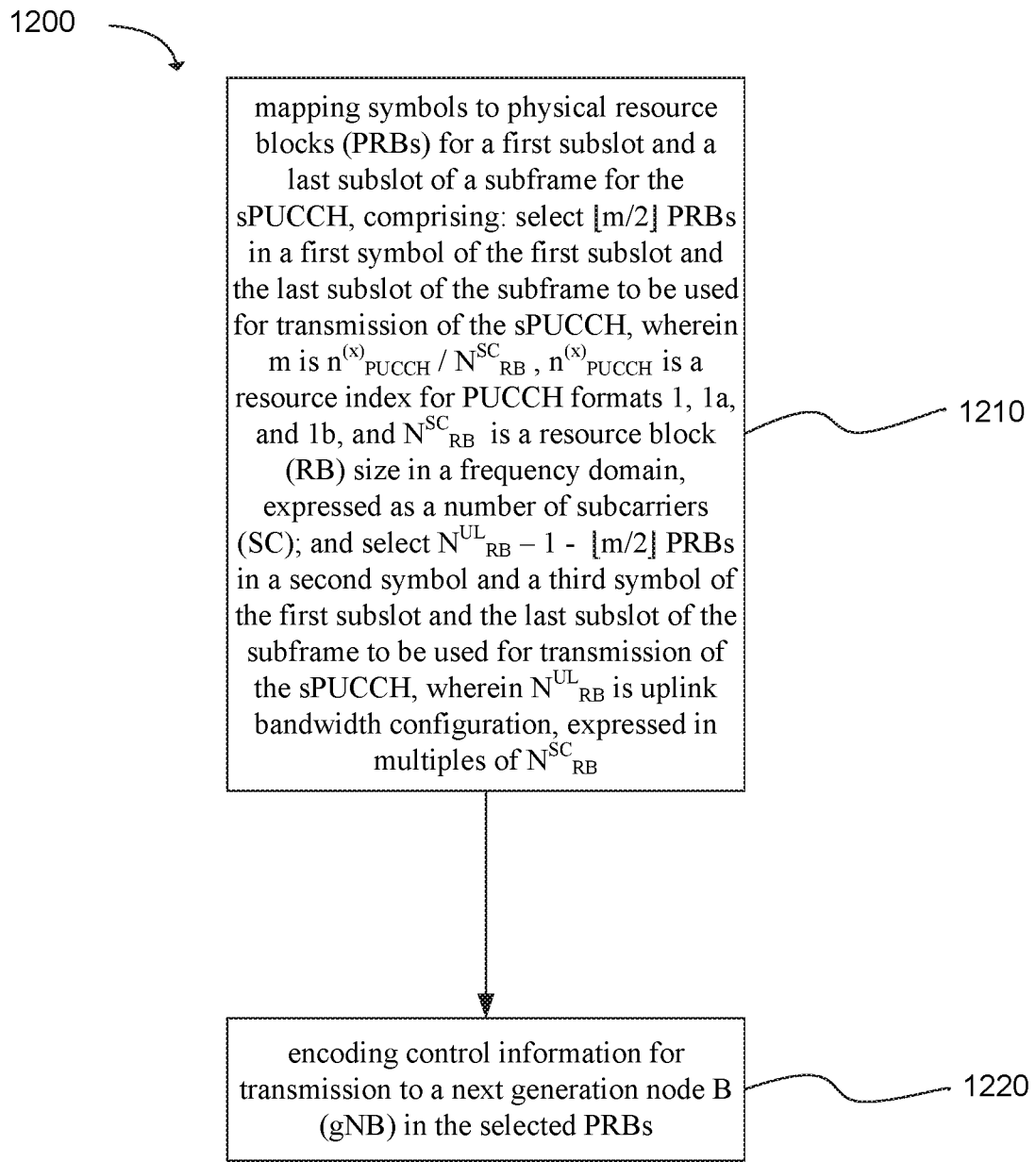
FIG. 12 depicts a flowchart of a machine readable storage medium having instructions embodied thereon for transmission of a shortened physical uplink control channel (sPUCCH) in accordance with an example.

Another example provides at least one machine readable storage medium having instructions 1200 embodied thereon for performing transmission of a shortened physical uplink control channel (sPUCCH), as shown in FIG. 12. The instructions can be executed on a machine, where the instructions are included on at least one computer readable medium or one non-transitory machine readable storage medium. The instructions when executed perform: mapping symbols to physical resource blocks (PRBs) for a first subslot and a last subslot of a subframe for the sPUCCH, comprising: select $$\left\lfloor \frac{m}{2} \right\rfloor$$

PRBs in a first symbol of the first subslot and the last subslot of the subframe to be used for transmission of the sPUCCH, wherein m is $$\frac{n_{PUCCH}^{(x)}}{N_{SC}^{RB}},$$

$n_{PUCCH}^{(x)}$ is a resource index for PUCCH formats 1, 1a, and 1b, and $N_{SC}^{RB}$ is a resource block (RB) size in a frequency domain, expressed as a number of subcarriers (SC); and select $$N_{RB}^{UL} - 1 - \left\lfloor \frac{m}{2} \right\rfloor$$

PRBs in a second symbol and a third symbol of the first subslot and the last subslot of the subframe to be used for transmission of the sPUCCH, wherein $N_{RB}^{UL}$ is uplink bandwidth configuration, expressed in multiples of $N_{SC}^{RB}$, as in block 1210. The instructions when executed perform: encoding control information for transmission to a next generation node B (gNB) in the selected PRBs, as in block 1220.

Figure 13:
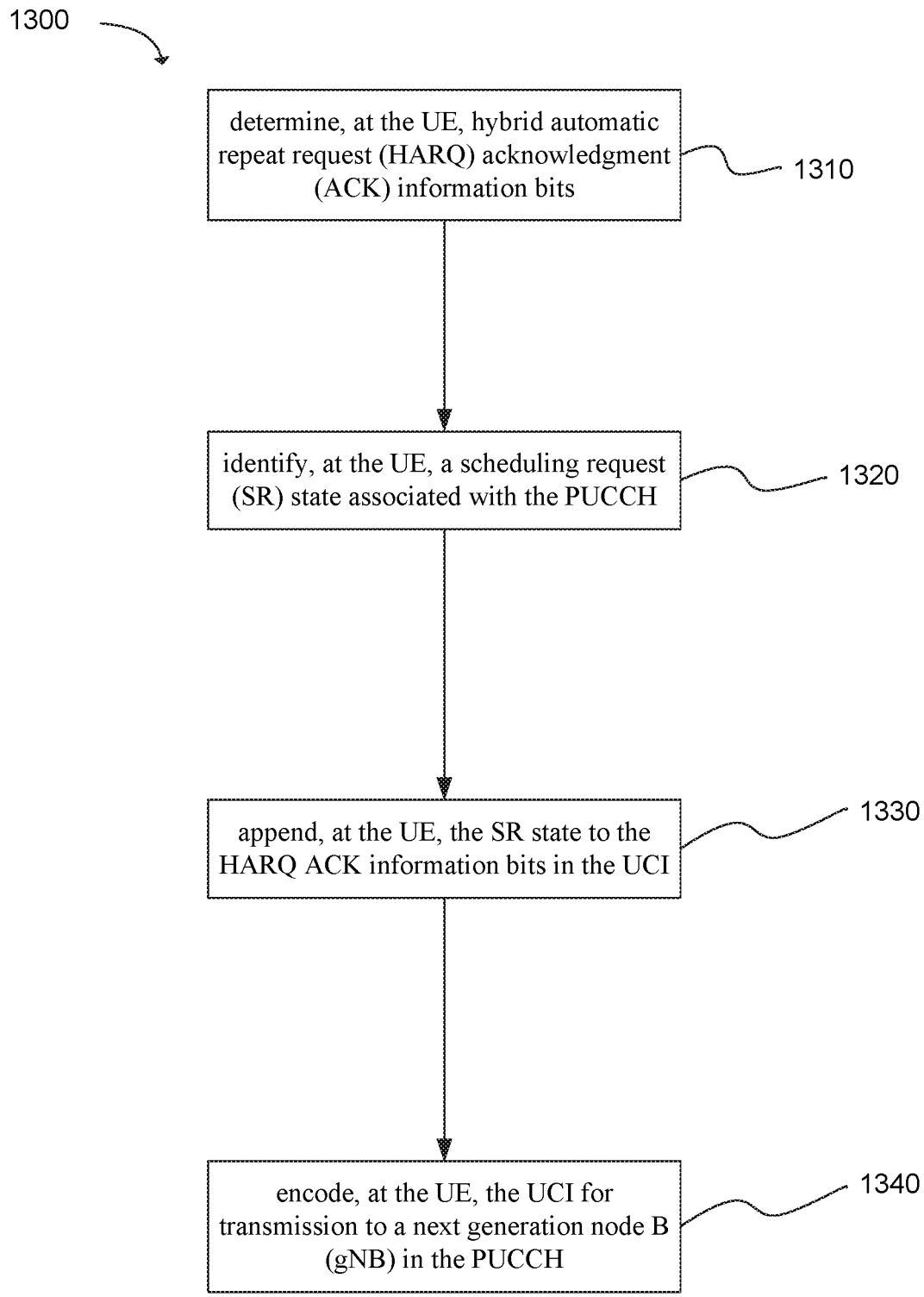
FIG. 13 depicts functionality of a user equipment (UE) operable for transmission of uplink control information (UCI) in a physical uplink control channel (PUCCH) in accordance with an example.

Another example provides functionality 1300 of user equipment (UE) operable for transmission of uplink control information (UCI) in a physical uplink control channel (PUCCH), as shown in FIG. 13. The UE can comprise one or more processors. The one or more processors can be configured to determine, at the UE, hybrid automatic repeat request (HARQ) acknowledgment (ACK) information bits, as in block 1310. The one or more processors can be configured to identify, at the UE, a scheduling request (SR) state associated with the PUCCH, as in block 1320. The one or more processors can be configured to append, at the UE, the SR state to the HARQ ACK information bits in the UCI, as in block 1330. The one or more processors can be configured to encode, at the UE, the UCI for transmission to a next generation node B (gNB) in the PUCCH, as in block 1340. In addition, the UE can comprise a memory interface configured to retrieve the SR state from a memory.

While examples have been provided in which a gNB has been specified, they are not intended to be limiting. An eNB can be used in place of the gNB. Accordingly, unless otherwise stated, any example herein in which a gNB has been disclosed, can similarly be disclosed with the use of an eNB.

Figure 14:
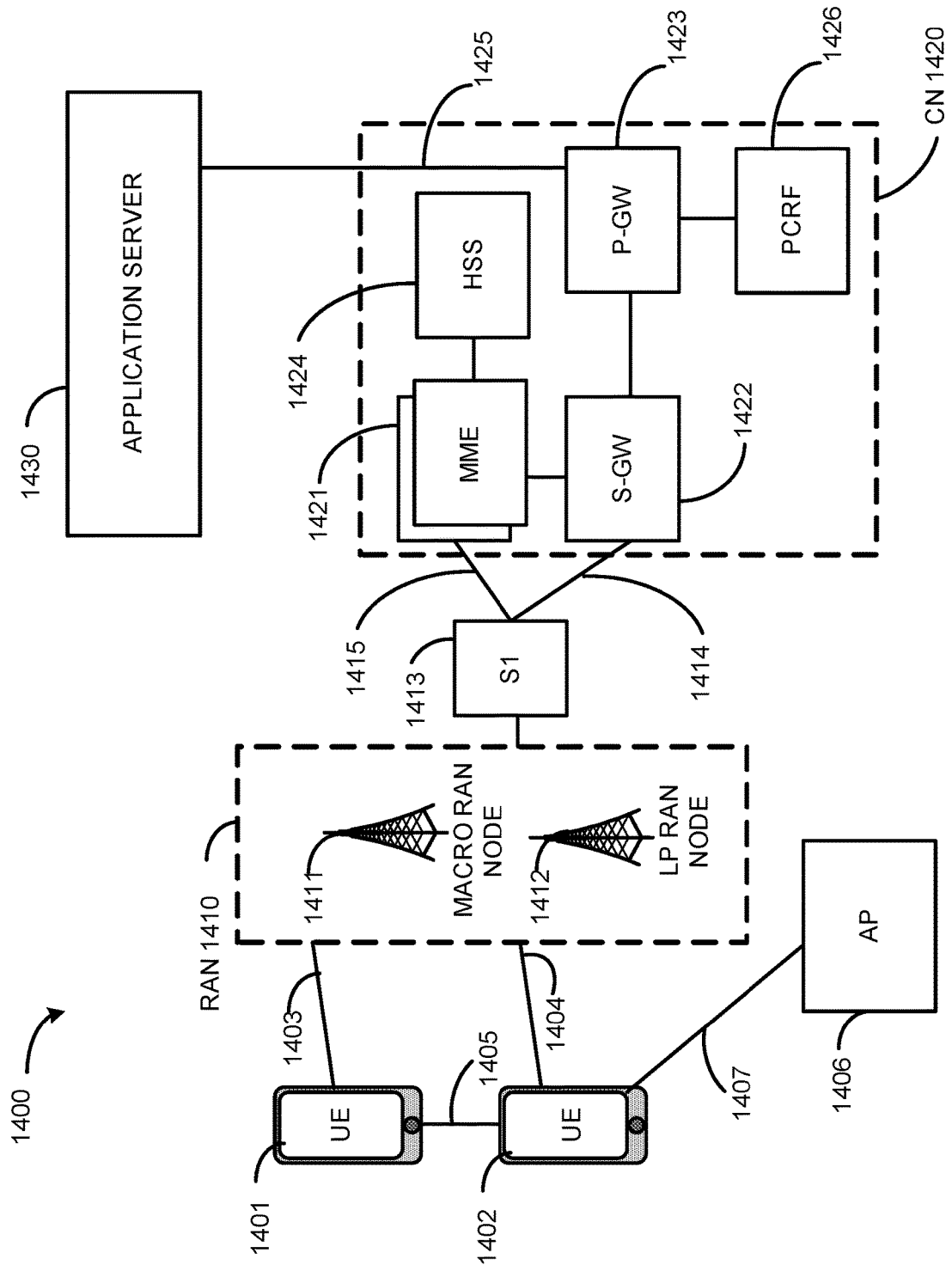
FIG. 14 illustrates an architecture of a wireless network in accordance with an example.

FIG. 14 illustrates an architecture of a system 1400 of a network in accordance with some embodiments. The system 1400 is shown to include a user equipment (UE) 1401 and a UE 1402. The UEs 1401 and 1402 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1401 and 1402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1401 and 1402 may be configured to connect, e.g., communicatively couple, with a radio access network (RAN) 1410—the RAN 1410 may be, for example, an Evolved Universal Mobile Telecommunications System (UMTS) Terrestrial Radio Access Network (E-UTRAN), a NextGen RAN (NG RAN), or some other type of RAN. The UEs 1401 and 1402 utilize connections 1403 and 1404, respectively, each of which comprises a physical communications interface or layer (discussed in further detail below); in this example, the connections 1403 and 1404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1401 and 1402 may further directly exchange communication data via a ProSe interface 1405. The ProSe interface 1405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1402 is shown to be configured to access an access point (AP) 1406 via connection 1407. The connection 1407 can comprise a local wireless connection, such as a connection consistent with any IEEE 802.15 protocol, wherein the AP 1406 would comprise a wireless fidelity (WiFi®) router. In this example, the AP 1406 is shown to be connected to the Internet without connecting to the core network of the wireless system (described in further detail below).

The RAN 1410 can include one or more access nodes that enable the connections 1403 and 1404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1410 may include one or more RAN nodes for providing macrocells, e.g., macro RAN node 1411, and one or more RAN nodes for providing femtocells or picocells (e.g., cells having smaller coverage areas, smaller user capacity, or higher bandwidth compared to macrocells), e.g., low power (LP) RAN node 1412.

Any of the RAN nodes 1411 and 1412 can terminate the air interface protocol and can be the first point of contact for the UEs 1401 and 1402. In some embodiments, any of the RAN nodes 1411 and 1412 can fulfill various logical functions for the RAN 1410 including, but not limited to, radio network controller (RNC) functions such as radio bearer management, uplink and downlink dynamic radio resource management and data packet scheduling, and mobility management.

In accordance with some embodiments, the UEs 1401 and 1402 can be configured to communicate using Orthogonal Frequency-Division Multiplexing (OFDM) communication signals with each other or with any of the RAN nodes 1411 and 1412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1411 and 1412 to the UEs 1401 and 1402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1401 and 1402. The physical downlink control channel (PDCCH) may carry information about the transport format and resource allocations related to the PDSCH channel, among other things. It may also inform the UEs 1401 and 1402 about the transport format, resource allocation, and H-ARQ (Hybrid Automatic Repeat Request) information related to the uplink shared channel. Typically, downlink scheduling (assigning control and shared channel resource blocks to the UE 1402 within a cell) may be performed at any of the RAN nodes 1411 and 1412 based on channel quality information fed back from any of the UEs 1401 and 1402. The downlink resource assignment information may be sent on the PDCCH used for (e.g., assigned to) each of the UEs 1401 and 1402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1410 is shown to be communicatively coupled to a core network (CN) 1420—via an S1 interface 1413. In embodiments, the CN 1420 may be an evolved packet core (EPC) network, a NextGen Packet Core (NPC) network, or some other type of CN. In this embodiment the S1 interface 1413 is split into two parts: the S1-U interface 1414, which carries traffic data between the RAN nodes 1411 and 1412 and the serving gateway (S-GW) 1422, and the S1-mobility management entity (MME) interface 1415, which is a signaling interface between the RAN nodes 1411 and 1412 and MMEs 1421.

In this embodiment, the CN 1420 comprises the MMEs 1421, the S-GW 1422, the Packet Data Network (PDN) Gateway (P-GW) 1423, and a home subscriber server (HSS) 1424. The MMEs 1421 may be similar in function to the control plane of legacy Serving General Packet Radio Service (GPRS) Support Nodes (SGSN). The MMEs 1421 may manage mobility aspects in access such as gateway selection and tracking area list management. The HSS 1424 may comprise a database for network users, including subscription-related information to support the network entities' handling of communication sessions. The CN 1420 may comprise one or several HSSs 1424, depending on the number of mobile subscribers, on the capacity of the equipment, on the organization of the network, etc. For example, the HSS 1424 can provide support for routing/roaming, authentication, authorization, naming/addressing resolution, location dependencies, etc.

The S-GW 1422 may terminate the S1 interface 1413 towards the RAN 1410, and routes data packets between the RAN 1410 and the CN 1420. In addition, the S-GW 1422 may be a local mobility anchor point for inter-RAN node handovers and also may provide an anchor for inter-3GPP mobility. Other responsibilities may include lawful intercept, charging, and some policy enforcement.

The P-GW 1423 may terminate an SGi interface toward a PDN. The P-GW 1423 may route data packets between the EPC network 1423 and external networks such as a network including the application server 1430 (alternatively referred to as application function (AF)) via an Internet Protocol (IP) interface 1425. Generally, the application server 1430 may be an element offering applications that use IP bearer resources with the core network (e.g., UMTS Packet Services (PS) domain, LTE PS data services, etc.). In this embodiment, the P-GW 1423 is shown to be communicatively coupled to an application server 1430 via an IP communications interface 1425. The application server 1430 can also be configured to support one or more communication services (e.g., Voice-over-Internet Protocol (VoIP) sessions, PTT sessions, group communication sessions, social networking services, etc.) for the UEs 1401 and 1402 via the CN 1420.

The P-GW 1423 may further be a node for policy enforcement and charging data collection. Policy and Charging Enforcement Function (PCRF) 1426 is the policy and charging control element of the CN 1420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1426 may be communicatively coupled to the application server 1430 via the P-GW 1423. The application server 1430 may signal the PCRF 1426 to indicate a new service flow and select the appropriate Quality of Service (QoS) and charging parameters. The PCRF 1426 may provision this rule into a Policy and Charging Enforcement Function (PCEF) (not shown) with the appropriate traffic flow template (TFT) and QoS class of identifier (QCI), which commences the QoS and charging as specified by the application server 1430.

Figure 15:
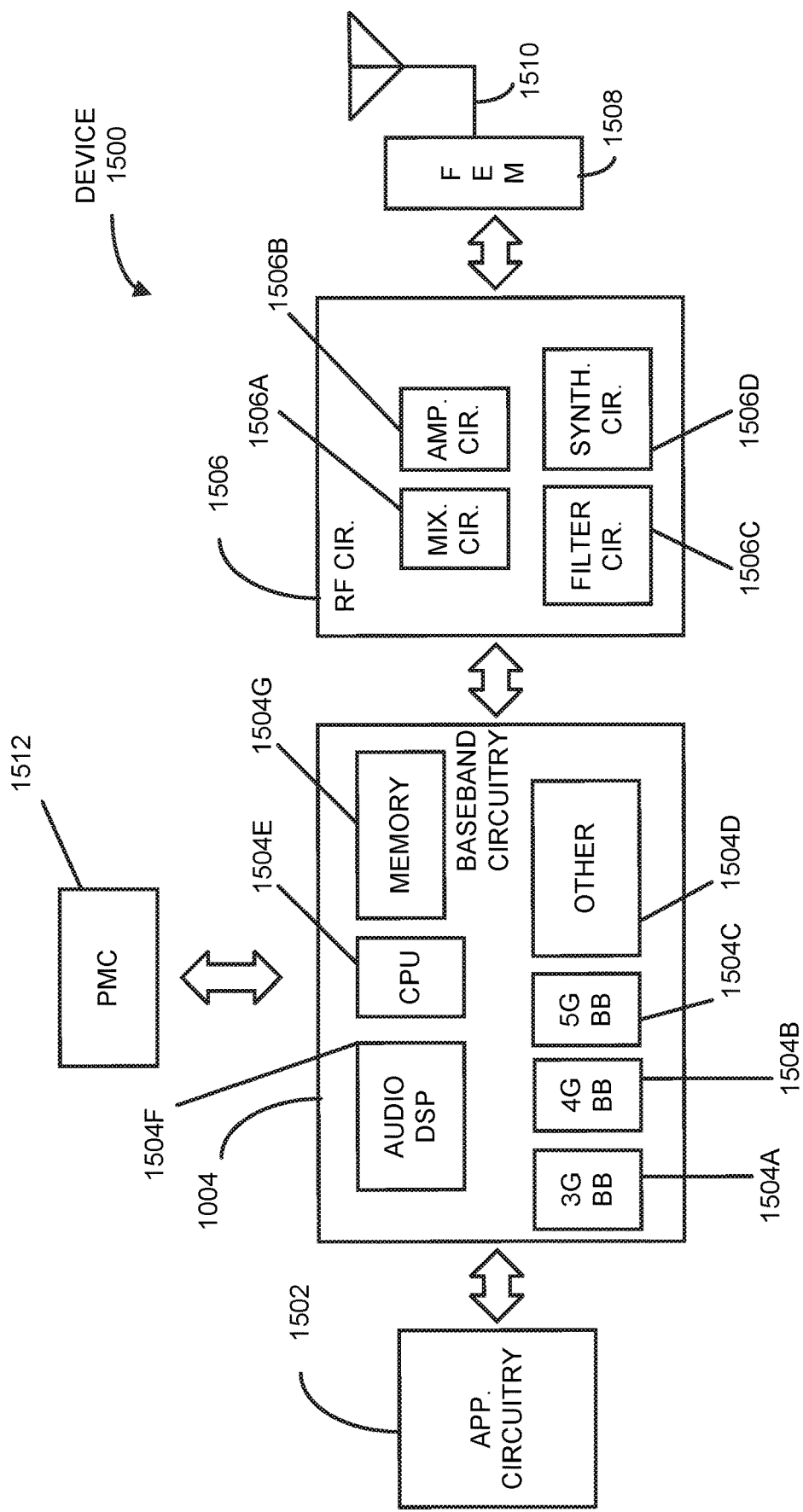
FIG. 15 illustrates a diagram of a wireless device (e.g., UE) in accordance with an example.

FIG. 15 illustrates example components of a device 1500 in accordance with some embodiments. In some embodiments, the device 1500 may include application circuitry 1502, baseband circuitry 1504, Radio Frequency (RF) circuitry 1506, front-end module (FEM) circuitry 1508, one or more antennas 1510, and power management circuitry (PMC) 1512 coupled together at least as shown. The components of the illustrated device 1500 may be included in a UE or a RAN node. In some embodiments, the device 1500 may include less elements (e.g., a RAN node may not utilize application circuitry 1502, and instead include a processor/controller to process IP data received from an EPC). In some embodiments, the device 1500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1502 may include one or more application processors. For example, the application circuitry 1502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1500. In some embodiments, processors of application circuitry 1502 may process IP data packets received from an EPC.

The baseband circuitry 1504 may include circuitry such as, but not limited to, one or more single-core or multi-core processors. The baseband circuitry 1504 may include one or more baseband processors or control logic to process baseband signals received from a receive signal path of the RF circuitry 1506 and to generate baseband signals for a transmit signal path of the RF circuitry 1506. Baseband processing circuitry 1504 may interface with the application circuitry 1502 for generation and processing of the baseband signals and for controlling operations of the RF circuitry 1506. For example, in some embodiments, the baseband circuitry 1504 may include a third generation (3G) baseband processor 1504*a*, a fourth generation (4G) baseband processor 1504*b*, a fifth generation (5G) baseband processor 1504*c*, or other baseband processor(s) 1504*d* for other existing generations, generations in development or to be developed in the future (e.g., second generation (2G), sixth generation (6G), etc.). The baseband circuitry 1504 (e.g., one or more of baseband processors 1504*a-d*) may handle various radio control functions that enable communication with one or more radio networks via the RF circuitry 1506. In other embodiments, some or all of the functionality of baseband processors 1504*a-d* may be included in modules stored in the memory 1504*g* and executed via a Central Processing Unit (CPU) 1504*e*. The radio control functions may include, but are not limited to, signal modulation/demodulation, encoding/decoding, radio frequency shifting, etc. In some embodiments, modulation/demodulation circuitry of the baseband circuitry 1504 may include Fast-Fourier Transform (FFT), precoding, or constellation mapping/demapping functionality.

In some embodiments, encoding/decoding circuitry of the baseband circuitry 1504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1504 may include one or more audio digital signal processor(s) (DSP) 1504*f*. The audio DSP(s) 1504*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1504 and the application circuitry 1502 may be implemented together such as, for example, on a system on a chip (SOC).

In some embodiments, the baseband circuitry 1504 may provide for communication compatible with one or more radio technologies. For example, in some embodiments, the baseband circuitry 1504 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1504 is configured to support radio communications of more than one wireless protocol may be referred to as multi-mode baseband circuitry.

RF circuitry 1506 may enable communication with wireless networks using modulated electromagnetic radiation through a non-solid medium. In various embodiments, the RF circuitry 1506 may include switches, filters, amplifiers, etc. to facilitate the communication with the wireless network. RF circuitry 1506 may include a receive signal path which may include circuitry to down-convert RF signals received from the FEM circuitry 1508 and provide baseband signals to the baseband circuitry 1504. RF circuitry 1506 may also include a transmit signal path which may include circuitry to up-convert baseband signals provided by the baseband circuitry 1504 and provide RF output signals to the FEM circuitry 1508 for transmission.

In some embodiments, the receive signal path of the RF circuitry 1506 may include mixer circuitry 1506*a*, amplifier circuitry 1506*b* and filter circuitry 1506*c*. In some embodiments, the transmit signal path of the RF circuitry 1506 may include filter circuitry 1506*c* and mixer circuitry 1506*a*. RF circuitry 1506 may also include synthesizer circuitry 1506*d* for synthesizing a frequency for use by the mixer circuitry 1506*a* of the receive signal path and the transmit signal path. In some embodiments, the mixer circuitry 1506*a* of the receive signal path may be configured to down-convert RF signals received from the FEM circuitry 1508 based on the synthesized frequency provided by synthesizer circuitry 1506*d*. The amplifier circuitry 1506*b* may be configured to amplify the down-converted signals and the filter circuitry 1506*c* may be a low-pass filter (LPF) or band-pass filter (BPF) configured to remove unwanted signals from the down-converted signals to generate output baseband signals. Output baseband signals may be provided to the baseband circuitry 1504 for further processing. In some embodiments, the output baseband signals may be zero-frequency baseband signals, although this is not a necessity. In some embodiments, mixer circuitry 1506*a* of the receive signal path may comprise passive mixers, although the scope of the embodiments is not limited in this respect.

In some embodiments, the mixer circuitry 1506*a* of the transmit signal path may be configured to up-convert input baseband signals based on the synthesized frequency provided by the synthesizer circuitry 1506*d* to generate RF output signals for the FEM circuitry 1508. The baseband signals may be provided by the baseband circuitry 1504 and may be filtered by filter circuitry 1506*c*.

In some embodiments, the mixer circuitry 1506*a* of the receive signal path and the mixer circuitry 1506*a* of the transmit signal path may include two or more mixers and may be arranged for quadrature downconversion and upconversion, respectively. In some embodiments, the mixer circuitry 1506*a* of the receive signal path and the mixer circuitry 1506*a* of the transmit signal path may include two or more mixers and may be arranged for image rejection (e.g., Hartley image rejection). In some embodiments, the mixer circuitry 1506*a* of the receive signal path and the mixer circuitry 1506*a* may be arranged for direct downconversion and direct upconversion, respectively. In some embodiments, the mixer circuitry 1506*a* of the receive signal path and the mixer circuitry 1506*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1506 may include analog-to-digital converter (ADC) and digital-to-analog converter (DAC) circuitry and the baseband circuitry 1504 may include a digital baseband interface to communicate with the RF circuitry 1506.

In some dual-mode embodiments, a separate radio IC circuitry may be provided for processing signals for each spectrum, although the scope of the embodiments is not limited in this respect.

In some embodiments, the synthesizer circuitry 1506*d* may be a fractional-N synthesizer or a fractional N/N+1 synthesizer, although the scope of the embodiments is not limited in this respect as other types of frequency synthesizers may be suitable. For example, synthesizer circuitry 1506d may be a delta-sigma synthesizer, a frequency multiplier, or a synthesizer comprising a phase-locked loop with a frequency divider.

The synthesizer circuitry 1506d may be configured to synthesize an output frequency for use by the mixer circuitry 1506a of the RF circuitry 1506 based on a frequency input and a divider control input. In some embodiments, the synthesizer circuitry 1506d may be a fractional N/N+1 synthesizer.

In some embodiments, frequency input may be provided by a voltage controlled oscillator (VCO), although that is not a necessity. Divider control input may be provided by either the baseband circuitry 1504 or the applications processor 1502 depending on the desired output frequency. In some embodiments, a divider control input (e.g., N) may be determined from a look-up table based on a channel indicated by the applications processor 1502.

Synthesizer circuitry 1506d of the RF circuitry 1506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1506 may include an IQ/polar converter.

FEM circuitry 1508 may include a receive signal path which may include circuitry configured to operate on RF signals received from one or more antennas 1510, amplify the received signals and provide the amplified versions of the received signals to the RF circuitry 1506 for further processing. FEM circuitry 1508 may also include a transmit signal path which may include circuitry configured to amplify signals for transmission provided by the RF circuitry 1506 for transmission by one or more of the one or more antennas 1510. In various embodiments, the amplification through the transmit or receive signal paths may be done solely in the RF circuitry 1506, solely in the FEM 1508, or in both the RF circuitry 1506 and the FEM 1508.

In some embodiments, the FEM circuitry 1508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1506). The transmit signal path of the FEM circuitry 1508 may include a power amplifier (PA) to amplify input RF signals (e.g., provided by RF circuitry 1506), and one or more filters to generate RF signals for subsequent transmission (e.g., by one or more of the one or more antennas 1510).

In some embodiments, the PMC 1512 may manage power provided to the baseband circuitry 1504. In particular, the PMC 1512 may control power-source selection, voltage scaling, battery charging, or DC-to-DC conversion. The PMC 1512 may often be included when the device 1500 is capable of being powered by a battery, for example, when the device is included in a UE. The PMC 1512 may increase the power conversion efficiency while providing desirable implementation size and heat dissipation characteristics.

While FIG. 15 shows the PMC 1512 coupled only with the baseband circuitry 1504. However, in other embodiments, the PMC 1512 may be additionally or alternatively coupled with, and perform similar power management operations for, other components such as, but not limited to, application circuitry 1502, RF circuitry 1506, or FEM 1508.

In some embodiments, the PMC 1512 may control, or otherwise be part of, various power saving mechanisms of the device 1500. For example, if the device 1500 is in an RRC_Connected state, where it is still connected to the RAN node as it expects to receive traffic shortly, then it may enter a state known as Discontinuous Reception Mode (DRX) after a period of inactivity. During this state, the device 1500 may power down for brief intervals of time and thus save power.

If there is no data traffic activity for an extended period of time, then the device 1500 may transition off to an RRC_Idle state, where it disconnects from the network and does not perform operations such as channel quality feedback, handover, etc. The device 1500 goes into a very low power state and it performs paging where again it periodically wakes up to listen to the network and then powers down again. The device 1500 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1502 and processors of the baseband circuitry 1504 may be used to execute elements of one or more instances of a protocol stack. For example, processors of the baseband circuitry 1504, alone or in combination, may be used execute Layer 3, Layer 2, or Layer 1 functionality, while processors of the application circuitry 1504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 16:
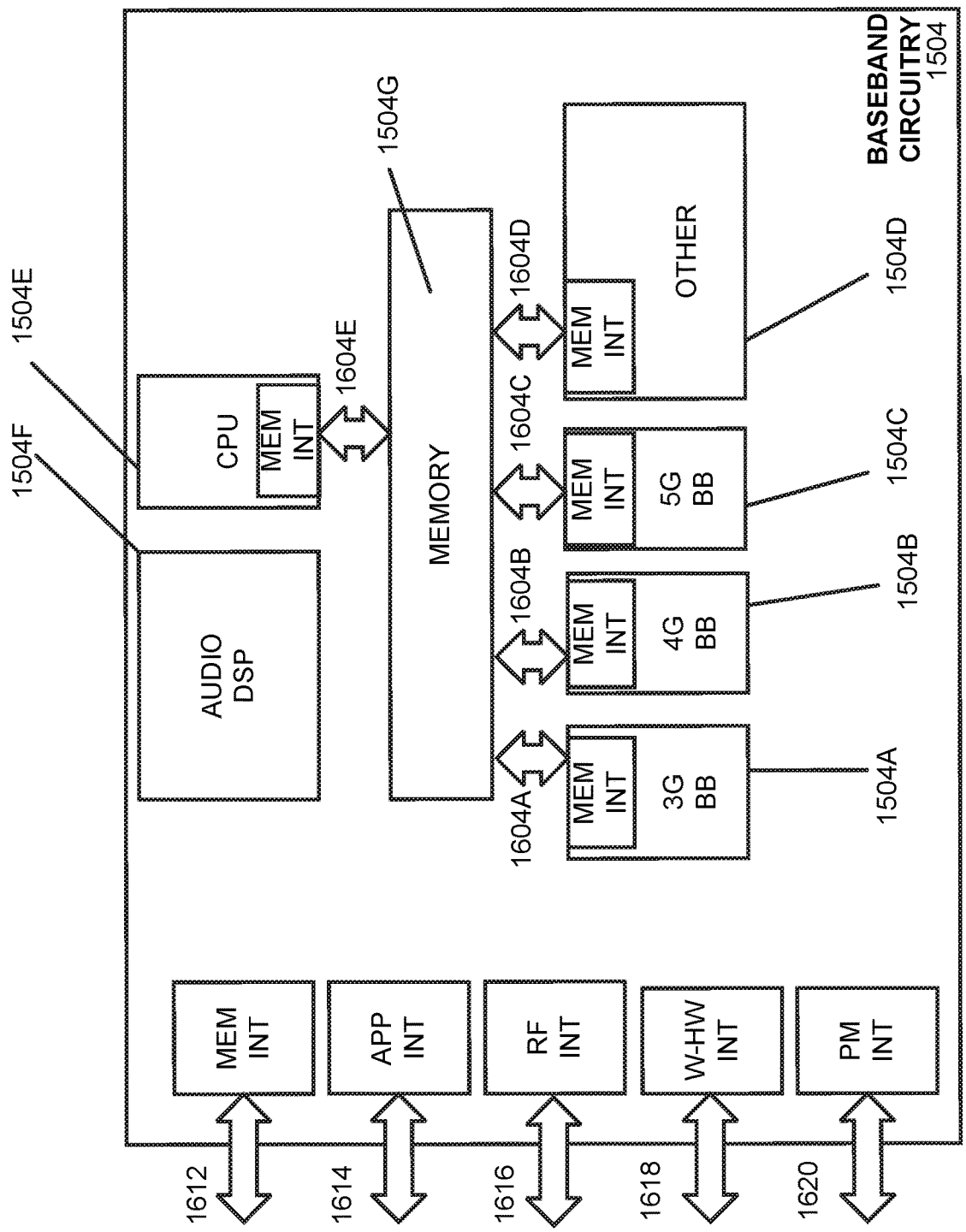
FIG. 16 illustrates interfaces of baseband circuitry in accordance with an example.

FIG. 16 illustrates example interfaces of baseband circuitry in accordance with some embodiments. As discussed above, the baseband circuitry 1504 of FIG. 15 may comprise processors 1504a-1504e and a memory 1504g utilized by said processors. Each of the processors 1504a-1504e may include a memory interface, 1604a-1604e, respectively, to send/receive data to/from the memory 1504g.

The baseband circuitry 1504 may further include one or more interfaces to communicatively couple to other circuitries/devices, such as a memory interface 1612 (e.g., an interface to send/receive data to/from memory external to the baseband circuitry 1504), an application circuitry interface 1614 (e.g., an interface to send/receive data to/from the application circuitry 1502 of FIG. 14), an RF circuitry interface 1616 (e.g., an interface to send/receive data to/from RF circuitry 1506 of FIG. 15), a wireless hardware connectivity interface 1618 (e.g., an interface to send/receive data to/from Near Field Communication (NFC) components, Bluetooth® components (e.g., Bluetooth® Low Energy), Wi-Fi® components, and other communication components), and a power management interface 1620 (e.g., an interface to send/receive power or control signals to/from the PMC 1512.

Figure 17:
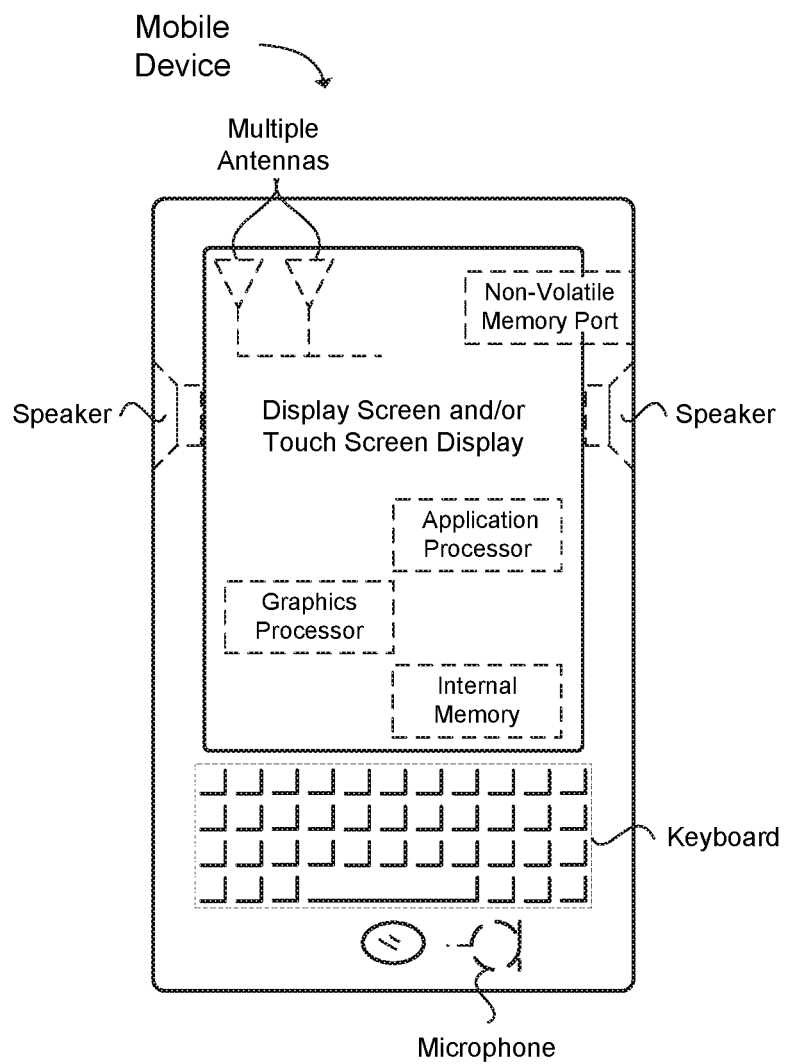
FIG. 17 illustrates a diagram of a wireless device (e.g., UE) in accordance with an example.

FIG. 17 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 17 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable for transmission of a shortened physical uplink control channel (sPUCCH), the apparatus comprising: one or more processors configured to: map symbols to physical resource blocks (PRBs) for a first subslot and a last subslot of a subframe for the sPUCCH, comprising: select $$\left\lfloor \frac{m}{2} \right\rfloor$$

PRBs in a first symbol or the first subslot and the last subslot of the subframe to be used for transmission of the sPUCCH, wherein m is $$\frac{n_{PUCCH}^{(x)}}{N_{SC}^{RB}},$$

$n_{PUCCH}^{(x)}$ is a resource index for PUCCH formats 1, 1a, and 1b, and $N_{SC}^{RB}$ is a resource block (RB) size in a frequency domain, expressed as a number of subcarriers (SC); and select $$N_{RB}^{UL} - 1 - \left\lfloor \frac{m}{2} \right\rfloor$$

PRBs in a second symbol and a third symbol of the first subslot and the last subslot of the subframe to be used for transmission of the sPUCCH, wherein $N_{RB}^{UL}$ is uplink bandwidth configuration, expressed in multiples of $N_{SC}^{RB}$; and encode control information for transmission to a next generation node B (gNB) in the sPUCCH in the selected PRBs; and a memory interface configured to retrieve the control information from a memory.

Example 2 includes the apparatus of Example 1, wherein the one or more processors are further configured to: map symbols to physical resource blocks (PRBs) for subslots not including the first subslot and the last subslot of the subframe for the sPUCCH, comprising: select $$\frac{m}{2}$$

PRBs in a first symbbol of a second subslot, a third subslot, a fourth subslot, and a fifth subslot of the subframe to be used for transmission of the sPUCCH; and select $$N_{RB}^{UL} - 1 - \left\lfloor \frac{m}{2} \right\rfloor$$

PRBs in a second symbol of the second subslot, the third subslot, the fourth subslot, and the fifth subslot of the subframe to be used for transmission of the sPUCCH; and encode control information for transmission to a gNB in the sPUCCH in the selected PRBs.

Example 3 includes the apparatus of Example 1, wherein the first subslot and the last subslot each comprise 3 symbols in the subframe.

Example 4 includes the apparatus of Example 2, wherein the second subslot, the third subslot, the fourth subslot, and the fifth subslot each comprise 2 symbols in the subframe.

Example 5 includes the apparatus of any of Examples 1 to 4, wherein the one or more processors are further configured to: encode a set of sPUCCH resources via higher layer signaling.

Example 6 includes the apparatus of any of Examples 1 to 4, further comprising a transceiver configured to: transmit the control information in the selected PRBs.

Example 7 includes the apparatus of any of Examples 1 to 4, wherein the UE includes an antenna, a touch sensitive display screen, a speaker, a microphone, a graphics processor, an application processor, an internal memory, a non-volatile memory port, or combinations thereof.

Example 8 includes an apparatus of a next generation node B (gNB) operable to receive a shortened physical uplink control channel (sPUCCH), the apparatus comprising: one or more processors configured to: identify $$\left\lfloor \frac{m}{2} \right\rfloor$$

physical resource moms (PRBs) in a first symbol of a first subslot and a last subslot of a subframe to be used for reception of the sPUCCH, wherein m is $$\frac{n_{PUCCH}^{(x)}}{N_{SC}^{RB}},$$

$n_{PUCCH}^{(x)}$ is a resource index for PUCCH formats 1, 1a, and 1b, and $N_{SC}^{RB}$ is a resource block (RB) size in a frequency domain, expressed as a number of subcarriers (SC); and identify $$N_{RB}^{UL} - 1 - \left\lfloor \frac{m}{2} \right\rfloor$$

PRBs in a second symbol and a third symbol of the first subslot and the last subslot of the subframe to be used for reception of the sPUCCH, wherein $N_{RB}^{UL}$ is uplink bandwidth configuration, expressed in multiples of $N_{SC}^{RB}$; and decode control information received from a user equipment (UE) in the identified PRBs; and a memory interface configured to send the control information to a memory.

Example 9 includes the apparatus of Example 8, wherein the one or more processors are further configured to: identify $$\frac{m}{2}$$

PRBs in a first symbol of a second subslot, a third subslot, a fourth subslot, and a fifth subslot of the subframe to be used for reception of the sPUCCH; and identify $$N_{RB}^{UL} - 1 - \left\lfloor \frac{m}{2} \right\rfloor$$

PRBs in a second symbol of the second subslot, the third subslot, the fourth subslot, and the fifth subslot of the subframe to be used for reception of the sPUCCH; and decode control information received from the UE in the selected PRBs.

Example 10 includes the apparatus of Example 8, wherein the first subslot and the last subslot each comprise 3 symbols in the subframe.

Example 11 includes the apparatus of Example 9, wherein the second subslot, the third subslot, the fourth subslot, and the fifth subslot each comprise 2 symbols in the subframe.

Example 12 includes the apparatus of any of Examples 8 to 11, wherein the one or more processors are further configured to: decode a set of sPUCCH resources via higher layer signaling.

Example 13 includes the apparatus of any of Examples 8 to 11, further comprising a transceiver configured to: receive the control information in the identified PRBs.

Example 14 includes at least one machine readable storage medium having instructions embodied thereon for transmission of a shortened physical uplink control channel (sPUCCH), the instructions when executed by one or more processors at a user equipment (UE) perform the following: mapping symbols to physical resource blocks (PRBs) for a first subslot and a last subslot of a subframe for the sPUCCH, comprising: select $$\left\lfloor \frac{m}{2} \right\rfloor$$

PRBs in a first symbol of the first subslot and the last subslot of the subframe to be used for transmission of the sPUCCH, wherein m is $$\frac{n_{PUCCH}^{(x)}}{N_{SC}^{RB}},$$

$n_{PUCCH}^{(x)}$ is a resource index for PUCCH formats 1, 1a, and 1b, and $N_{SC}^{RB}$ is a resource block (RB) size in a frequency domain, expressed as a number of subcarriers (SC); and select $$N_{RB}^{UL} - 1 - \left\lfloor \frac{m}{2} \right\rfloor$$

PRBs in a second symbol and a third symbol of the first subslot and the last subslot of the subframe to be used for transmission of the sPUCCH, wherein $N_{RB}^{UL}$ is uplink bandwidth configuration, expressed in multiples of $N_{SC}^{RB}$; and encoding control information for transmission to a next generation node B (gNB) in the selected PRBs.

Example 15 includes the at least one machine readable storage medium of Example 14, further comprising instructions that when executed perform: mapping symbols to physical resource blocks (PRBs) for subslots not including the first subslot and the last subslot of the subframe for the sPUCCH, comprising: select $$\frac{m}{2}$$

PRBs in a first symbol of a second subslot, a third subslot, a fourth subslot, and a fifth subslot of the subframe to be used for transmission of the sPUCCH; and select $$N_{RB}^{UL} - 1 - \left\lfloor \frac{m}{2} \right\rfloor$$

PRBs in a second symbol of the second subslot, the third subslot, the fourth subslot, and the fifth subslot of the subframe to be used for transmission of the sPUCCH; and encode control information for transmission to a gNB in the selected PRBs.

Example 16 includes the at least one machine readable storage medium of Example 14, wherein the first subslot and the last subslot each comprise 3 symbols in the subframe.

Example 17 includes the at least one machine readable storage medium of Example 15, wherein the second subslot, the third subslot, the fourth subslot, and the fifth subslot each comprise 2 symbols in the subframe.

Example 18 includes the at least one machine readable storage medium of any of Examples 14 to 17, further comprising instructions that when executed perform: encoding a resource set via higher layer signaling.

Example 19 includes an apparatus of a user equipment (UE), operable for transmission of uplink control information (UCI) in a physical uplink control channel (PUCCH), the apparatus comprising: one or more processors configured to: determine, at the UE, hybrid automatic repeat request (HARQ) acknowledgment (ACK) information bits; identify, at the UE, a scheduling request (SR) state associated with the PUCCH; append, at the UE, the SR state to the HARQ ACK information bits in the UCI; encode, at the UE, the UCI for transmission to a next generation node B (gNB) in the PUCCH; and a memory interface configured to retrieve the SR state from a memory.

Example 20 includes the apparatus of Example 19, wherein the one or more processors are further configured to: identify, at the UE, channel state information (CSI) information bits for transmission in a second PUCCH; identify, at the UE, a scheduling request (SR) state associated with the second PUCCH; prepend, at the UE, the SR state to the CSI information bits in the UCI; and encode, at the UE, the UCI for transmission to a next generation node B (gNB) in the second PUCCH.

Example 21 includes a user equipment (UE) operable for transmission of a shortened physical uplink control channel (sPUCCH), the UE comprising: means for mapping symbols to physical resource blocks (PRBs) for a first subslot and a last subslot of a subframe for the sPUCCH, comprising: means for selecting $$\left\lfloor \frac{m}{2} \right\rfloor$$

PRBs in a first symbol of the first subslot and the last subslot of the subframe to be used for transmission of the sPUCCH, wherein m is $$\frac{n_{PUCCH}^{(x)}}{N_{SC}^{RB}},$$

$N_{PUCCH}^{(x)}$ a resource index for PUCCH formats 1, 1a, and 1b, and $N_{SC}^{RB}$ is a resource block (RB) size in a frequency domain, expressed as a number of subcarriers (SC); and means for selecting $$N_{RB}^{UL} - 1 - \left\lfloor \frac{m}{2} \right\rfloor$$

PRBs in a second symbol and a third symbol of the first subslot and the last subslot of the subframe to be used for transmission of the sPUCCH, wherein $N_{RB}^{UL}$ is uplink bandwidth configuration, expressed in multiples of $N_{SC}^{RB}$; and means for encoding control information for transmission to a next generation node B (gNB) in the selected PRBs.

Example 22 includes the UE of Example 21, the UE further comprising: means for mapping symbols to physical resource blocks (PRBs) for subslots not including the first subslot and the last subslot of the subframe for the sPUCCH, comprising: means for selecting $$\frac{m}{2}$$

PRBs in a first symbol of a second subslot, a third subslot, a fourth subslot, and a fifth subslot of the subframe to be used for transmission of the sPUCCH; and means for selecting $$N_{RB}^{UL} - 1 - \left\lfloor \frac{m}{2} \right\rfloor$$

PRBs in a second symbol of the second subslot, the third subslot, the fourth subslot, and the fifth subslot of the subframe to be used for transmission of the sPUCCH; and means for encoding control information for transmission to a gNB in the selected PRBs.

Example 23 includes the UE of Example 21, wherein the first subslot and the last subslot each comprise 3 symbols in the subframe.

Example 24 includes the UE of Example 22, wherein the second subslot, the third subslot, the fourth subslot, and the fifth subslot each comprise 2 symbols in the subframe.

Example 25 includes the UE of any of Examples 21 to 24, the UE further comprising: means for encoding a resource set via higher layer signaling.

Example 26 includes the apparatus of any of Examples 1 to 7, the apparatus further comprising at least one machine readable storage medium having instructions embodied thereon that, when executed on the one or more processors, cause the apparatus to perform the operations of any of Examples 1 to 7.

Example 27 includes the at least one machine readable storage medium of claim 14, wherein: the first subslot and the last subslot each comprise 3 symbols in the subframe, and wherein the second subslot, the third subslot, the fourth subslot, and the fifth subslot each comprise 2 symbols in the subframe.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus contained within a user equipment (UE), that is operable for transmission of control information on a shortened physical uplink control channel (sPUCCH), the apparatus comprising:
one or more baseband processors configured to:
map symbols to physical resource block (PRB) indices for a first subslot and a last subslot of a subframe for the sPUCCH, comprising:
select an $$\left\lfloor \frac{m}{2} \right\rfloor$$

PRB index for a first symbol of the first subslot and the last subslot of the subframe to be used for transmission of the control information on the sPUCCH, wherein m is $$\frac{n_{PUCCH}^{(x)}}{N_{SC}^{RB}},$$

$n_{PUCCH}^{(x)}$ is a resource index for PUCCH formats 1, 1a, and 1b, and $N_{SC}^{RB}$ is a resource block (RB) size in a frequency domain, expressed as a number of subcarriers (SC); and
select a $$N_{RB}^{UL} - 1 - \left\lfloor \frac{m}{2} \right\rfloor$$

PRB index for a second symbol and a third symbol of the first subslot and the last subslot of the subframe to be used for transmission of the control information on the sPUCCH, wherein $N_{RB}^{UL}$ is uplink bandwidth configuration, expressed in multiples of $N_{SC}^{RB}$; and
encode the control information for transmission to a base station on the sPUCCH in the selected PRB indices; and
a memory interface configured to retrieve the control information from a memory.

2. The apparatus of claim 1, wherein the one or more baseband processors are further configured to:
map symbols to a physical resource block (PRB) index for subslots not including the first subslot and the last subslot of the subframe for the sPUCCH, comprising:
select an $$\left\lfloor \frac{m}{2} \right\rfloor$$

PRB index in a first symbol of a second subslot, a third subslot, a fourth subslot, and a fifth subslot of the subframe to be used for transmission of the control information on the sPUCCH; and
select a $$N_{RB}^{UL} - 1 - \left\lfloor \frac{m}{2} \right\rfloor$$

PRB index in a second symbol of the second subslot, the third subslot, the fourth subslot, and the fifth subslot of the subframe to be used for transmission of the control information on the sPUCCH; and
encode the control information for transmission to the base station on the sPUCCH in the selected PRB indices.

3. The apparatus of claim 1, wherein the first subslot and the last subslot each comprise 3 symbols in the subframe.

4. The apparatus of claim 1, wherein the second subslot, the third subslot, the fourth subslot, and the fifth subslot each comprise 2 symbols in the subframe.

5. The apparatus of claim 1, wherein the one or more baseband processors are further configured to:
encode a set of sPUCCH resources for transmission via radio resource control (RRC) signaling.

6. The apparatus of claim 1, further comprising a transceiver configured to:
transmit the control information in the selected PRB indices.

7. The apparatus of claim 1, wherein the UE includes an antenna, a touch sensitive display screen, a speaker, a microphone, a graphics processor, an application processor, an internal memory, a non-volatile memory port, or combinations thereof.

8. An apparatus contained within a base station, that is operable to receive a shortened physical uplink control channel (sPUCCH), the apparatus comprising:
one or more baseband processors configured to:
identify an $$\left\lfloor \frac{m}{2} \right\rfloor$$

physical resource block (PRB) index for a first symbol of a first subslot and a last subslot of a subframe to be used for reception of the control information on the sPUCCH, wherein m is $$\frac{n_{PUCCH}^{(x)}}{N_{SC}^{RB}},$$

$n_{PUCCH}^{(x)}$ is a resource index for PUCCH formats 1, 1a, and 1b, and $N_{SC}^{RB}$ is a resource block (RB) size in a frequency domain, expressed as a number of subcarriers (SC); and
identify a $$N_{RB}^{UL} - 1 - \left\lfloor \frac{m}{1} \right\rfloor$$

PRB index for a second symbol and a third symbol of the first subslot and the last subslot of the subframe to be used for reception of the control information on the sPUCCH, wherein $N_{RB}^{UL}$ is uplink bandwidth configuration, expressed in multiples of $N_{SC}^{RB}$; and
decode the control information received from a user equipment (UE) on the sPUCCH in the identified PRB indices; and
a memory interface configured to send the control information to a memory.

9. The apparatus of claim 8, wherein the one or more baseband processors are further configured to:
identify an $$\frac{m}{2}$$

PRB index in a first symbol of a second subslot, a third subslot, a fourth subslot, and a fifth subslot of the subframe to be used for reception of the control information on the sPUCCH; and
identify a $$N_{RB}^{UL} - 1 - \left\lfloor \frac{m}{2} \right\rfloor$$

PRB index in a second symbol of the second subslot, the third subslot, the fourth subslot, and the fifth subslot of the subframe to be used for reception of the control information on the sPUCCH; and
  decode the control information received from the UE on the sPUCCH in the identified PRB indices.

10. The apparatus of claim 8, wherein the first subslot and the last subslot each comprise 3 symbols in the subframe.

11. The apparatus of claim 9, wherein the second subslot, the third subslot, the fourth subslot, and the fifth subslot each comprise 2 symbols in the subframe.

12. The apparatus of claim 8, wherein the one or more baseband processors are further configured to:
  decode a set of sPUCCH resources for transmission via radio resource control (RRC) signaling.

13. The apparatus of any of claim 8, further comprising a transceiver configured to:
  receive the control information in the identified PRB indices.

14. At least one non-transitory machine readable storage medium having instructions embodied thereon for transmission of control information on a shortened physical uplink control channel (sPUCCH), the instructions when executed by one or more processors at a user equipment (UE) perform the following:
  mapping symbols to physical resource blocks (PRB) indices for a first subslot and a last subslot of a subframe for the sPUCCH, comprising:
    select an $$\left\lfloor \frac{m}{2} \right\rfloor$$

PRB index in a first symbol of the first subslot and the last subslot of the subframe to be used for transmission of the control information on the sPUCCH, wherein m is $$\frac{n_{PUCCH}^{(x)}}{N_{SC}^{RB}},$$

$n_{PUCCH}^{(x)}$ is a resource index for PUCCH formats 1, 1a, and 1b, and $N_{SC}^{RB}$ is a resource block (RB) size in a freauencv domain, expressed as a number of subcarriers (SC); and
    select a $$N_{RB}^{UL} - 1 - \left\lfloor \frac{m}{2} \right\rfloor$$

PRB index for a second symbol and a third symbol of the first subslot and the last subslot of the subframe to be used for transmission of the control information on the sPUCCH, wherein $N_{RB}^{UL}$ is uplink bandwidth configuration, expressed in multiples of $N_{SC}^{RB}$; and
  encoding the control information for transmission to a base station on the sPUCCH in the selected PRB indices.

15. The at least one non-transitory machine readable storage medium of claim 14, further comprising instructions that when executed perform:
  mapping symbols to physical resource blocks (PRBs) for subslots not including the first sub slot and the last subslot of the subframe for the sPUCCH, comprising:
    select an $$\left\lfloor \frac{m}{2} \right\rfloor$$

PRB index in a first symbol of a second subslot, a third subslot, a fourth subslot, and a fifth subslot of the subframe to be used for transmission of the control information on the sPUCCH; and
    select a $$N_{RB}^{UL} - 1 - \left\lfloor \frac{m}{2} \right\rfloor$$

PRB index in a second symbol of the second subslot, the third subslot, the fourth subslot, and the fifth subslot of the subframe to be used for transmission of the control information on the sPUCCH; and
  encode the control information for transmission to the base station on the sPUCCH in the selected PRB indices.

16. The at least one non-transitory machine readable storage medium of claim 14, wherein the first subslot and the last subslot each comprise 3 symbols in the subframe.

17. The at least one non-transitory machine readable storage medium of claim 15, wherein the second subslot, the third subslot, the fourth subslot, and the fifth subslot each comprise 2 symbols in the subframe.

18. The at least one non-transitory machine readable storage medium of claim 14, further comprising instructions that when executed perform:
  encoding a resource set for transmission via radio resource control (RRC) signaling.

* * * * *